United States Patent
Hopmann et al.

(10) Patent No.: US 11,371,318 B2
(45) Date of Patent: Jun. 28, 2022

(54) SYSTEM AND METHOD FOR ELECTRICAL CONTROL OF DOWNHOLE WELL TOOLS

(71) Applicant: WEATHERFORD TECHNOLOGY HOLDINGS, LLC, Houston, TX (US)

(72) Inventors: Don A. Hopmann, Alvin, TX (US); Sebastiaan J. Wolters, Kingwood, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 16/996,492

(22) Filed: Aug. 18, 2020

(65) Prior Publication Data
US 2021/0062614 A1    Mar. 4, 2021

Related U.S. Application Data

(60) Provisional application No. 62/894,236, filed on Aug. 30, 2019.

(51) Int. Cl.
*E21B 34/06* (2006.01)
*E21B 43/14* (2006.01)
(Continued)

(52) U.S. Cl.
CPC ............ *E21B 34/066* (2013.01); *E21B 43/14* (2013.01); *F16H 1/28* (2013.01); *F16H 25/24* (2013.01);
(Continued)

(58) Field of Classification Search
CPC ................................ E21B 34/066; B60L 3/06
See application file for complete search history.

(56) References Cited

U.S. PATENT DOCUMENTS 2,679,559 A * 5/1954 Morris ................... G05G 15/04
200/47
4,207,565 A * 6/1980 Isakson ............... F15B 15/2807
116/272
(Continued)

FOREIGN PATENT DOCUMENTS

WO   2005111484 A2   11/2005
WO   2007116264 A1   10/2007
(Continued)

OTHER PUBLICATIONS

International Search Report and Written Opinion dated Dec. 9, 2020 for IA PCT/US20/46790, 19 pages.

*Primary Examiner* — Cathleen R Hutchins
(74) *Attorney, Agent, or Firm* — Smith IP Services, P.C.

(57) ABSTRACT

A system for use with a subterranean well can include a system controller with a computer, a power supply and at least one current sensor, multiple downhole well tools, each of the downhole well tools including a motor and a member displaceable by the motor; and an umbilical connected between the system controller and the downhole well tools, at least one conductor of the umbilical being connected to the motor of each of the downhole well tools. A downhole well tool example can include an actuator assembly configured to displace a member of the downhole well tool, the actuator assembly including a motor, a load yoke displaceable by the motor, and an elongated position indicator bar having at least one profile formed thereon. Friction between the load yoke and the position indicator bar varies as the load yoke displaces relative to the position indicator bar.

13 Claims, 24 Drawing Sheets

(51) Int. Cl.
*F16H 1/28* (2006.01)
*F16H 25/24* (2006.01)
*H02K 7/06* (2006.01)
*H02K 7/116* (2006.01)

(52) U.S. Cl.
CPC ............... *H02K 7/06* (2013.01); *H02K 7/116* (2013.01); *E21B 2200/06* (2020.05)

(56) References Cited

U.S. PATENT DOCUMENTS

| | | | | |
|---|---|---|---|---|
| 4,251,698 | A * | 2/1981 | Raab | H01H 3/0206 200/160 |
| 4,373,582 | A * | 2/1983 | Bednar | E21B 21/103 166/321 |
| 4,403,664 | A | 9/1983 | Sullinger | |
| 4,693,131 | A * | 9/1987 | Teramachi | F16H 25/2204 74/89.32 |
| 5,547,029 | A | 8/1996 | Rubbo et al. | |
| 5,646,495 | A * | 7/1997 | Toyozawa | G05B 19/19 318/625 |
| 5,744,877 | A | 4/1998 | Owens | |
| 5,941,307 | A | 8/1999 | Tubel | |
| 6,041,857 | A | 3/2000 | Carmody et al. | |
| 6,237,683 | B1 | 5/2001 | Pringle et al. | |
| 6,276,458 | B1 | 8/2001 | Malone et al. | |
| 6,334,486 | B1 | 1/2002 | Carmody et al. | |
| 6,364,023 | B1 | 4/2002 | Hiron et al. | |
| 6,509,732 | B1 | 1/2003 | Rhodes et al. | |
| 7,673,683 | B2 | 3/2010 | Gissler | |
| 7,779,912 | B2 | 8/2010 | Gissler | |
| 7,828,066 | B2 | 11/2010 | Jahn | |
| 8,049,128 | B1 * | 11/2011 | Witt | H01H 9/06 200/522 |
| 8,836,325 | B2 | 9/2014 | Prost et al. | |
| 2005/0263280 | A1 | 12/2005 | Sellers | |
| 2011/0100471 | A1 | 5/2011 | Schroeder | |
| 2016/0047209 | A1 | 2/2016 | Castillo | |

FOREIGN PATENT DOCUMENTS

| | | |
|---|---|---|
| WO | 2014065820 A1 | 5/2014 |
| WO | 2016108858 A1 | 7/2016 |

* cited by examiner

SYSTEM AND METHOD FOR ELECTRICAL CONTROL OF DOWNHOLE WELL TOOLS

BACKGROUND

This disclosure relates generally to equipment utilized and operations performed in conjunction with a subterranean well and, in an example described below, more particularly provides for electrical control of multiple interval control valves or other downhole well tools.

Many different types of downhole well tools can be actuated in a well. Valves, packers, fluid samplers, formation testers, pumps, inflow control devices and perforators are a few non-limiting examples of well tools that can be actuated downhole.

In some situations, it is desirable to electrically actuate multiple downhole well tools using electrical power supplied from surface. In these situations, it is desirable to minimize a number of electrical conductors used to conduct power between the surface and the downhole well tools. In addition, it is desirable to reduce or eliminate the use of sensitive electronics in hostile downhole environments.

It will, therefore, be readily appreciated that improvements are continually needed in the art of electrically controlling actuation of downhole well tools. The present disclosure provides such improvements to the art. The improvements may be utilized with one or more downhole well tools actuated in response to electrical power supplied from the surface on a land-based or water-based well.

DETAILED DESCRIPTION

Figure 1:
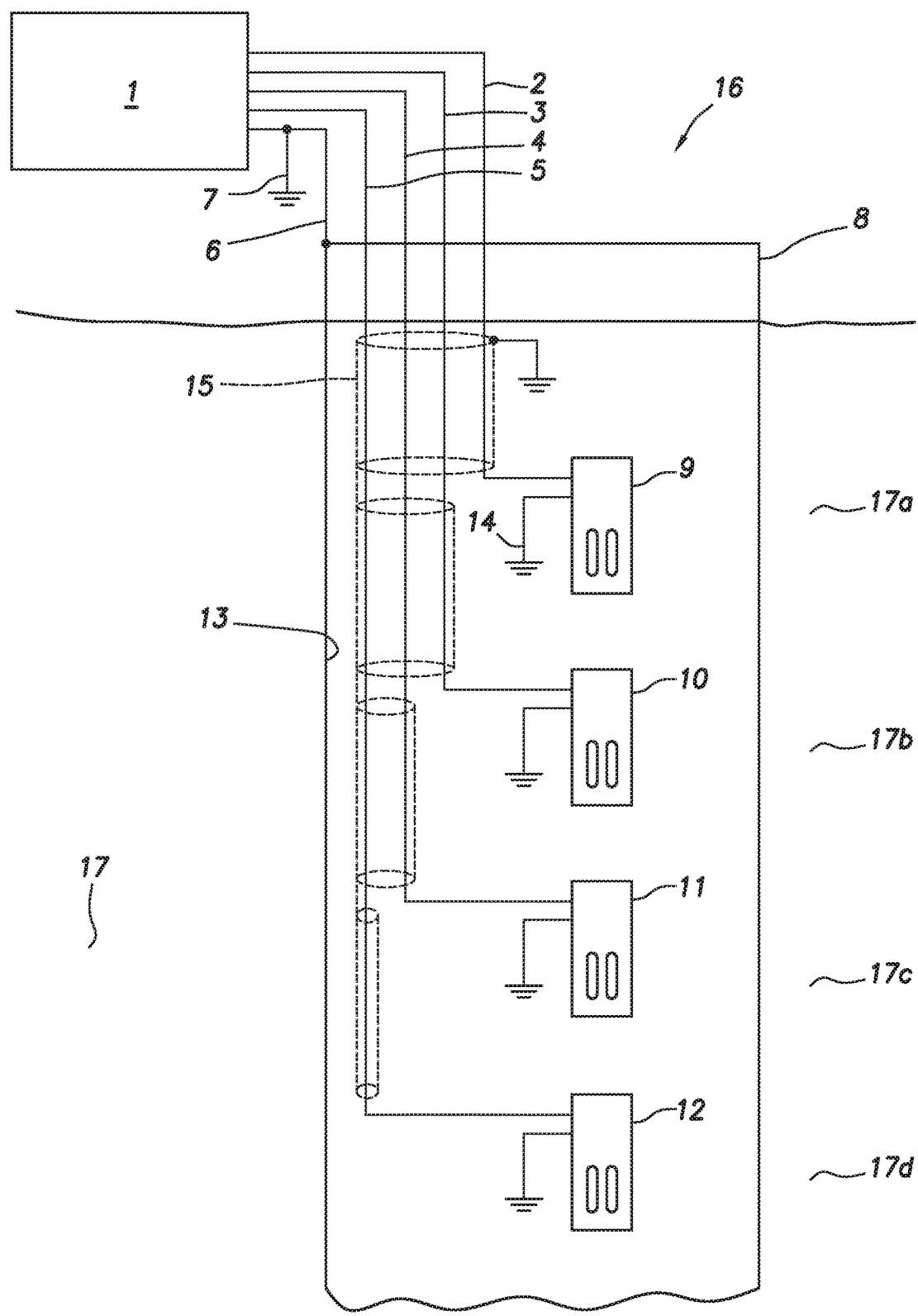
FIG. 1 is a representative schematic view of an example of a well system and associated method which can embody principles of this disclosure.

Representatively illustrated in the accompanying drawings is a system and method for electric flow control in a well, which system and method can embody principles of this disclosure. However, it should be clearly understood that the system and method are merely one example of an application of the principles of this disclosure in practice, and a wide variety of other examples are possible. Therefore, the scope of this disclosure is not limited at all to the details of the system and method as described herein and/or depicted in the drawings.

In one aspect, this specification describes a method to electrically operate and control multiple downhole flow control devices without the use of complex electronics downhole. In another aspect, the present specification provides a system and method for electric actuation of flow control devices in a wellbore, in which the electrical downhole components of the actuator substantially consist of brushed DC motors.

Examples of an electric actuator associated with a multi-position flow control device described herein provide selective production from, or injection into, isolated intervals or zones in a wellbore. The actuator incorporates example methods of position indication, which is expressed as variations of the power draw of the electric actuator itself, as well as a current and lapse time algorithm. In these examples, the system utilizes multi-core Tubing Encased Conductors (TEC's) to minimize the number of lines to surface, and the method places a portion of the surface control system below the tubing hanger to minimize the number of electrical connections required to pass through the tubing hanger.

Referring now to FIG. 1, an example simplified schematic of a system 16 for use with a subterranean well is representatively illustrated. In this example, a wellbore 13 has been drilled into a reservoir formation 17. It is desired, in this example, to control flow of fluid between the wellbore 13 and each of multiple isolated intervals or zones 17*a-d*.

Four of the zones 17*a-d* are depicted in FIG. 1, but in other examples other numbers of zones may be present. The wellbore 13 is depicted in FIG. 1 as being generally vertical, but sections of the wellbore in which the principles of this disclosure are practiced could be inclined or generally horizontal, and the wellbore could be cased or uncased.

Thus, the scope of this disclosure is not limited at all to the details of the system 16 as depicted in the drawings or described herein.

In the FIG. 1 example, four electrically operated downhole flow control or interval control valves (ICVs) 9, 10, 11, 12 are installed in the wellbore 13 to selectively control production from, or injection into, the respective four individual zones 17a-d. In FIG. 1, the ICVs 9-12 are depicted as being separately positioned in the wellbore 13, but preferably the ICVs would be connected in a tubular string (such as, a production or injection tubing string) for flowing the fluid between the surface and each of the ICVs.

Note that the downhole flow control or interval control valves 9, 10, 11, 12 are examples of downhole well tools that can be actuated using the principles of this disclosure. However, any type of downhole well tool that can be actuated between positions or configurations (such as, open or closed, set or unset, extended or retracted, etc.) downhole can benefit from the principles of this disclosure. Thus, the scope of this disclosure is not limited to downhole valves, but instead is applicable to any of a wide variety of different downhole well tools.

As depicted in FIG. 1, each ICV 9-12 is individually powered and controlled by a surface system controller 1 via a respective individual conductor 2-6. ICV 9 is powered by the surface system controller 1 via conductor 2. ICV 10 is powered via conductor 3, and ICVs 11 and 12 are respectively powered via conductors 4 and 5. The system controller 1 is commonly grounded to the wellbore 13 (such as, via metal casing that lines the wellbore) and wellhead 8 via conductor 6 and at points 7, 14, and via a metal armor encasing 15 of the conductors within the wellbore.

Figure 2:
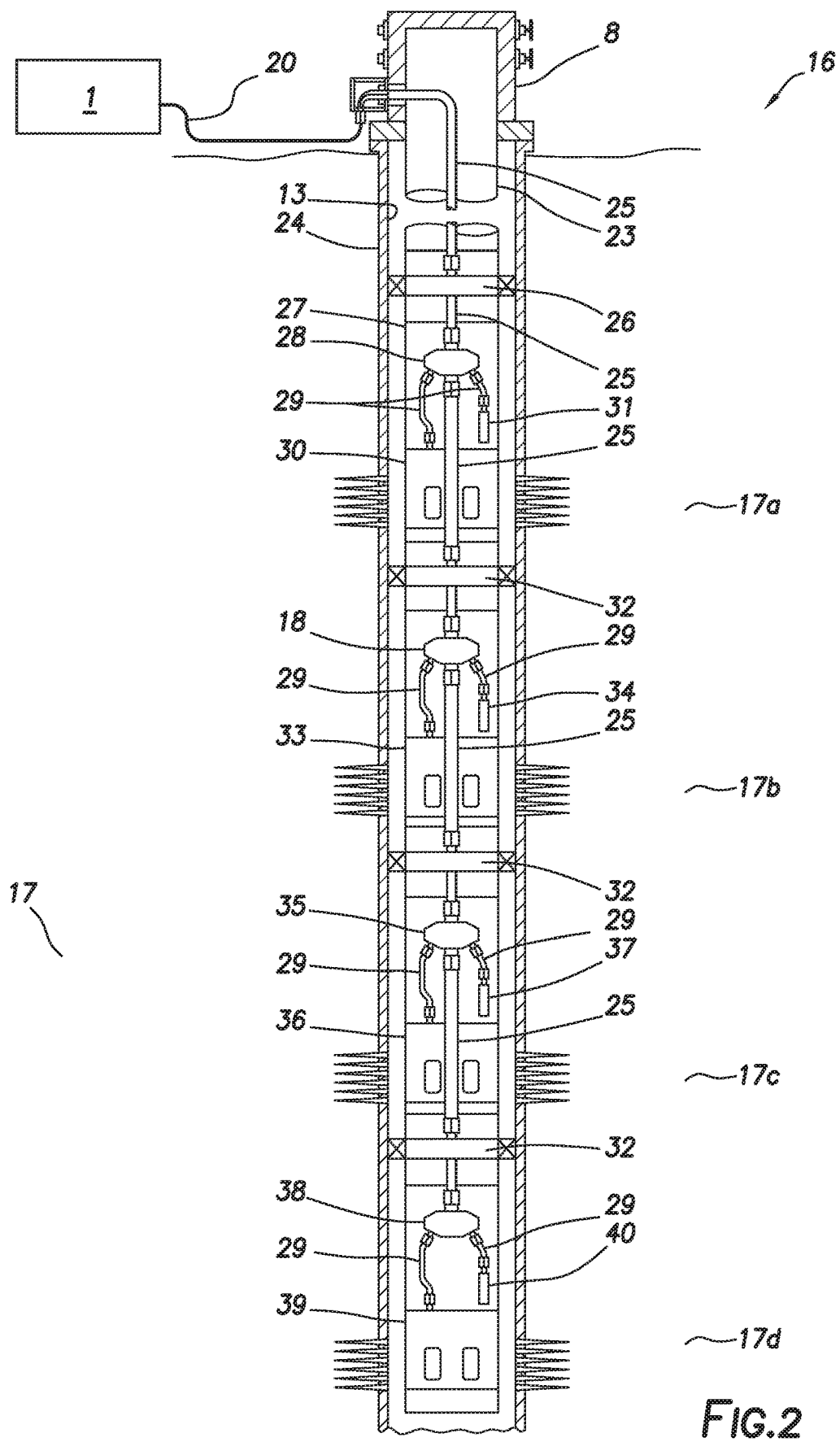
FIG. 2 is a representative partially cross-sectional view of another example of the well system and method.

Referring additionally now to FIG. 2, a more detailed partially cross-sectional view of another example of the system 16 and method is representatively illustrated. In this example, the wellbore 13 is lined with casing 24, which is perforated at each of the individual zones 17a-d. ICVs 30, 33, 36, 39 are connected in a tubular string 23 installed in the wellbore 13. The ICVs 30, 33, 36, 39 correspond to the ICVs 9-12 of the FIG. 1 example, and are configured to control flow between the wellbore 13 and an interior of the tubular string 23.

Conductors 2-5 are encased in a single umbilical 20 from the system controller 1 to the wellhead 8. At wellhead 8, the conductors 2-5 are encased in armored umbilical 25 down to a series of splices 28, 18, 35, 38. The armored umbilical 25 may be of the type known to those skilled in the art as a multi-conductor Tubing Encased Conductor (TEC).

Each splice 28, 18, 35, 38 in this example is located below a respective one of a feed-through production packer 26 and feed-through zonal isolation packers 32. The packers 26, 32 isolate the individual zones 17a-d from each other in the wellbore 13 (e.g., by sealing off between the casing 24 and the tubular string 23).

In the FIG. 2 example, each of the individual conductors 2-5 (see FIG. 1) inside the umbilical 25 is connected to its respective ICV 30, 33, 36, 39. The splices 28, 18, 35, 38 facilitate installation of the umbilical 25 through the packers 26, 32, and enable routing of each unique conductor 2-5 to the respective ICV 30, 33, 36, 39 via a single-conductor TEC 29 in each zone 17a-d.

The system 16 also provides for installation of electrical downhole pressure/temperature sensors or gauges 31, 34, 37, 40. The sensors or gauges 31, 34, 37, 40 may be used for reservoir monitoring in each of the zones 17a-d. Each of the sensors or gauges 31, 34, 37, 40 may be connected by a dedicated unique conductor. The downhole gauges 31, 34, 37, 40 can be installed in a multi-drop configuration, in which they share a same conductor (not shown, which is also encased in the umbilical 25).

Figure 3A:
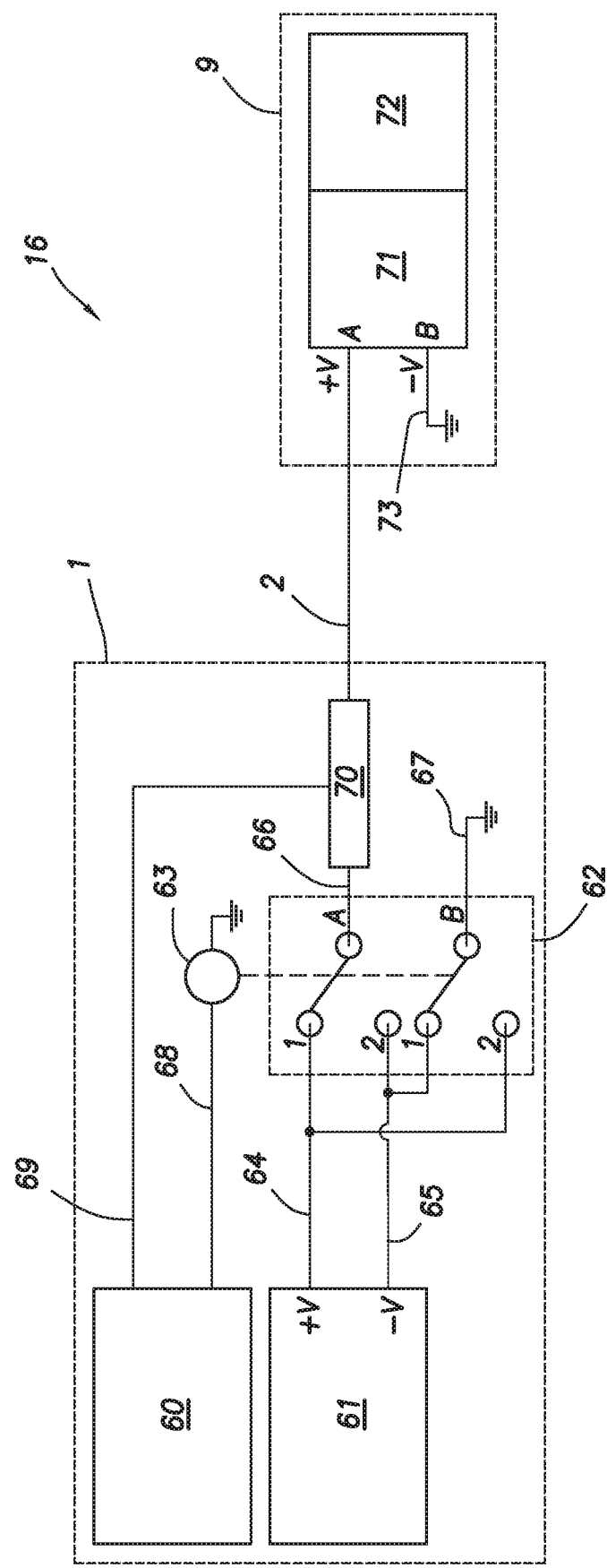
FIGS. 3A & B are representative schematic views of an example of the system with different electrical power polarities being supplied to a downhole well tool.

Referring additionally now to FIGS. 3A & B, an example of basic operational principles of the system 16 is representatively illustrated in schematic form. In this example, the system controller 1 is used to control operation of the ICV 9 in the FIG. 1 system, via the conductor 2.

As depicted in FIG. 3A, in a floating power supply configuration of the system controller 1, a combination of a power supply 61 and a computer 60 control DC power and polarity transmitted through the conductor 2 to the interval control valve 9. A DC motor 71 supplies torque to drive an actuator 72 of the ICV 9.

As mentioned above, the ICV 9 is grounded to the wellbore 13 at point 73. The power supply 61 provides both positive 64 and negative 65 output to a direction relay 62. The computer 60 controls a coil 63 of the direction relay 62 via an output 68. The computer 60 is also connected via an input 69 to a current sensor 70 capable of sensing electrical current in the conductor 2.

By powering the direction relay coil 63 on and off, the computer 60 controls the polarity of DC power transmitted to the DC motor 71 and, therefore, a direction that the motor turns. For example, positive polarity DC power applied to the conductor 2 will cause the motor 71 to rotate in one rotational direction (e.g., clockwise), and negative polarity DC power applied to the conductor 2 will cause the motor 71 to rotate in an opposite rotational direction (e.g., counterclockwise).

Figure 3B:
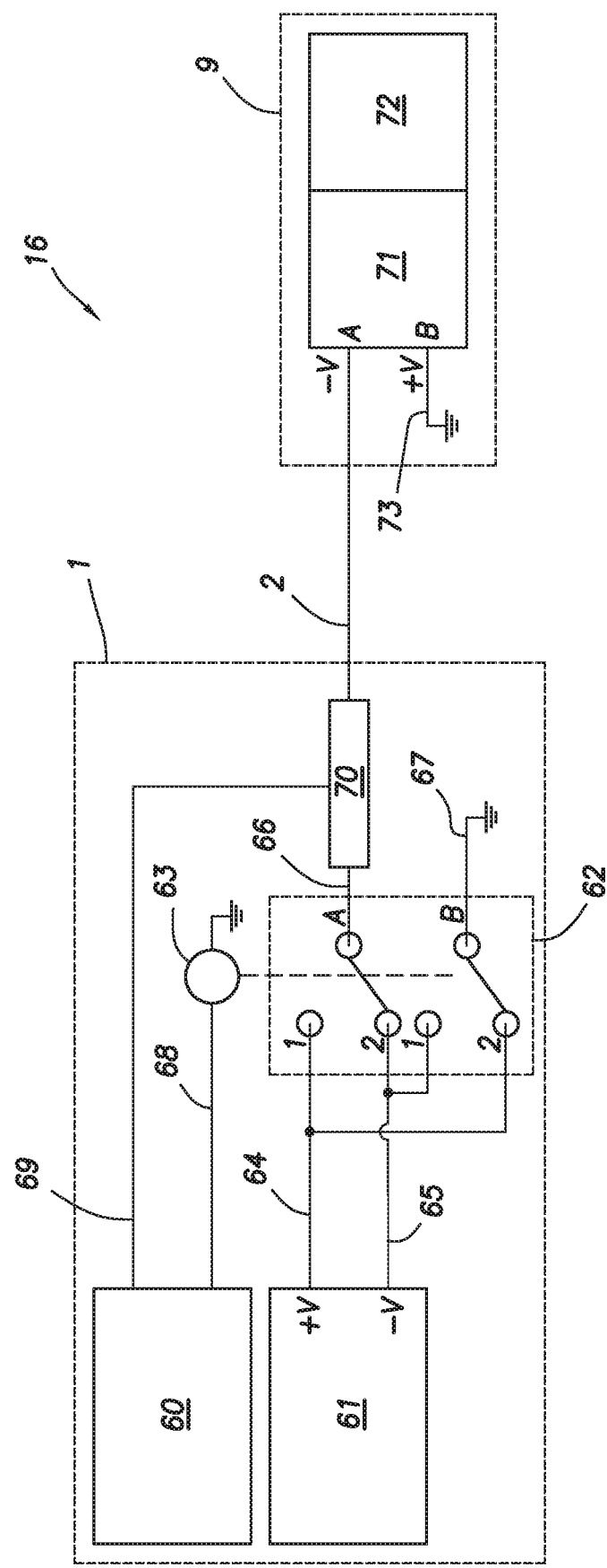

As depicted in FIG. 3A, the system controller 1 outputs positive voltage to the ICV 9. As depicted in FIG. 3B, the direction relay coil 63 is engaged, which reverses the DC power polarity and outputs negative voltage to the DC motor 71. This causes the motor 71 to turn in the opposite direction, and also causes the valve actuator 72 to move in an opposite direction.

Figure 4A:
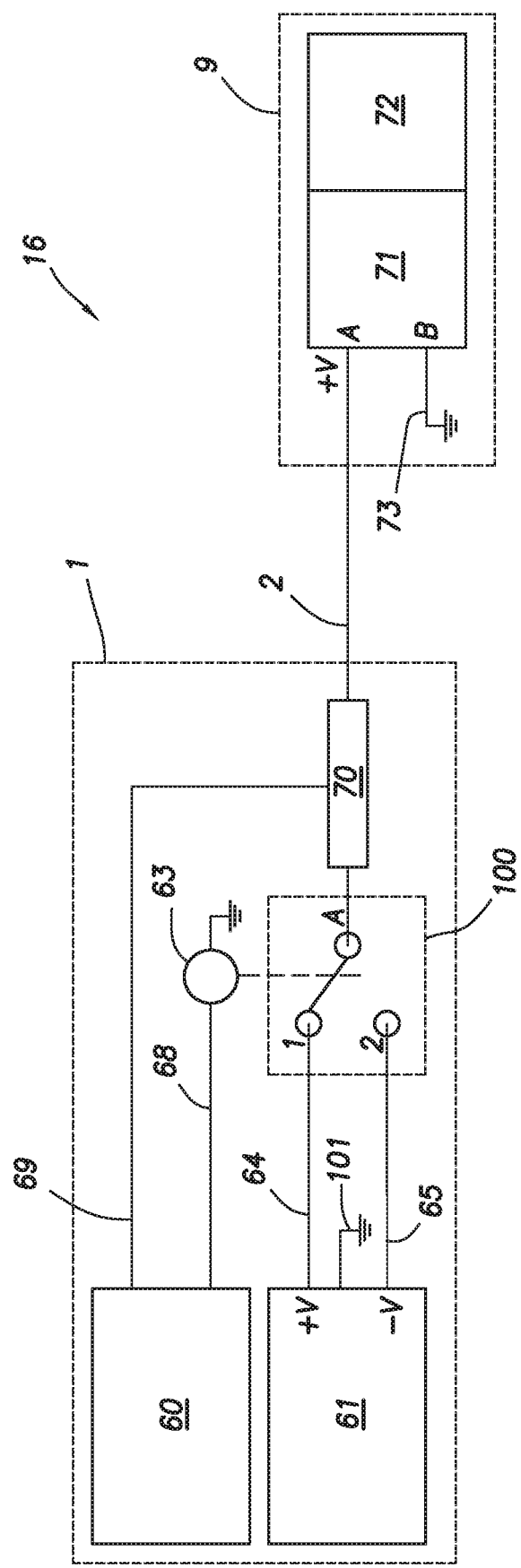
FIGS. 4A & B are representative schematic views of another example of the system with different electrical power polarities being supplied to a downhole well tool.

Referring additionally now to FIGS. 4A & B, another example of the system controller 1 in the system 16 is representatively illustrated. In this example, the power supply 61 is in a bi-polar configuration and is grounded to earth at point 101.

Figure 4B:
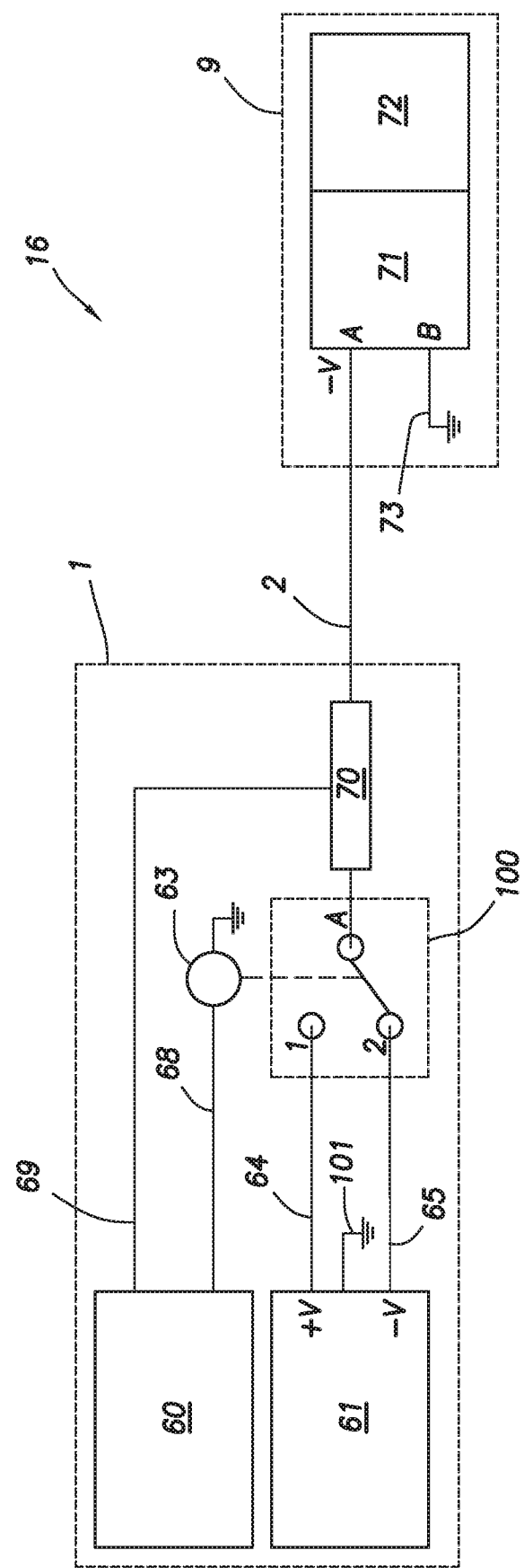

As depicted in FIG. 4A, the FIGS. 3A & B direction relay 62 is replaced by a voltage polarity relay 100 with single-pole double-throw contacts. Positive polarity DC power is supplied to the motor 71 via the conductor 2. FIG. 4B depicts the voltage polarity relay 100 engaged, which reverses the DC power polarity to the DC motor 71 (as compared to the FIG. 4A configuration) and, therefore, the direction in which the motor turns.

Figure 5:
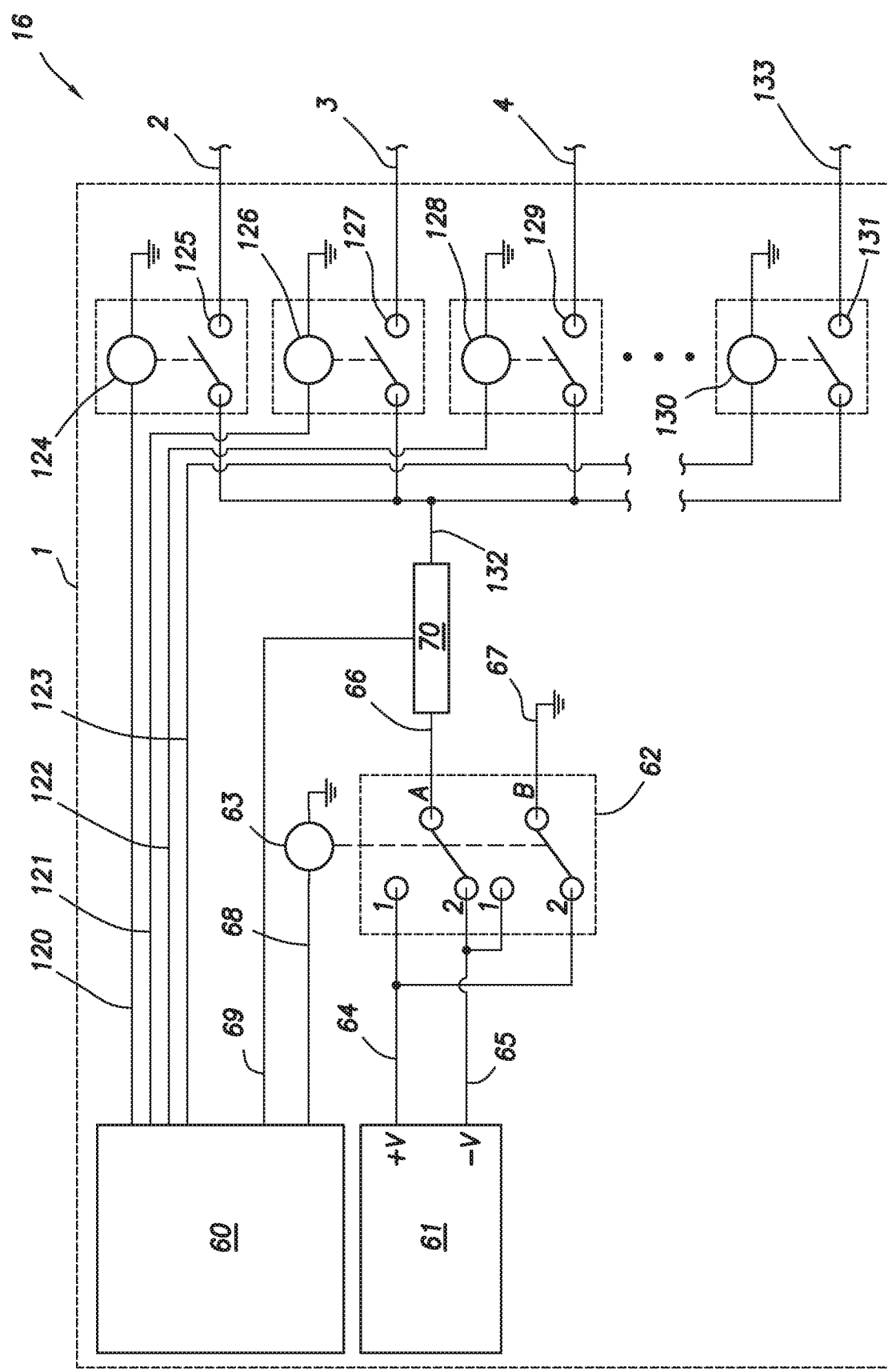
FIG. 5 is a representative schematic view of another example of the system, in which a single current sensor is used with multiple downhole well tools.

Referring additionally now to FIG. 5, another example of the system 16 is representatively illustrated. In this example, the system controller 1 is substantially similar to the FIGS. 3A & B system controller.

As depicted in FIG. 5, the system controller 1 is used to remotely operate N number of interval control valves that are connected to the system controller via conductors 2, 3, 4, 133. This example configuration utilizes the same computer 60, power supply 61 and direction relay 62 as the FIG. 3A example.

The computer 60 controls N number of output relay coils 124, 126, 128, 130 via respective conductors 120, 121, 122, 123 to close electric circuits of one or more of relay contacts 125, 127, 129, 131. This configuration utilizes a single current sensor 70 and as such is optimized for actuating one ICV at a time.

Figure 6:
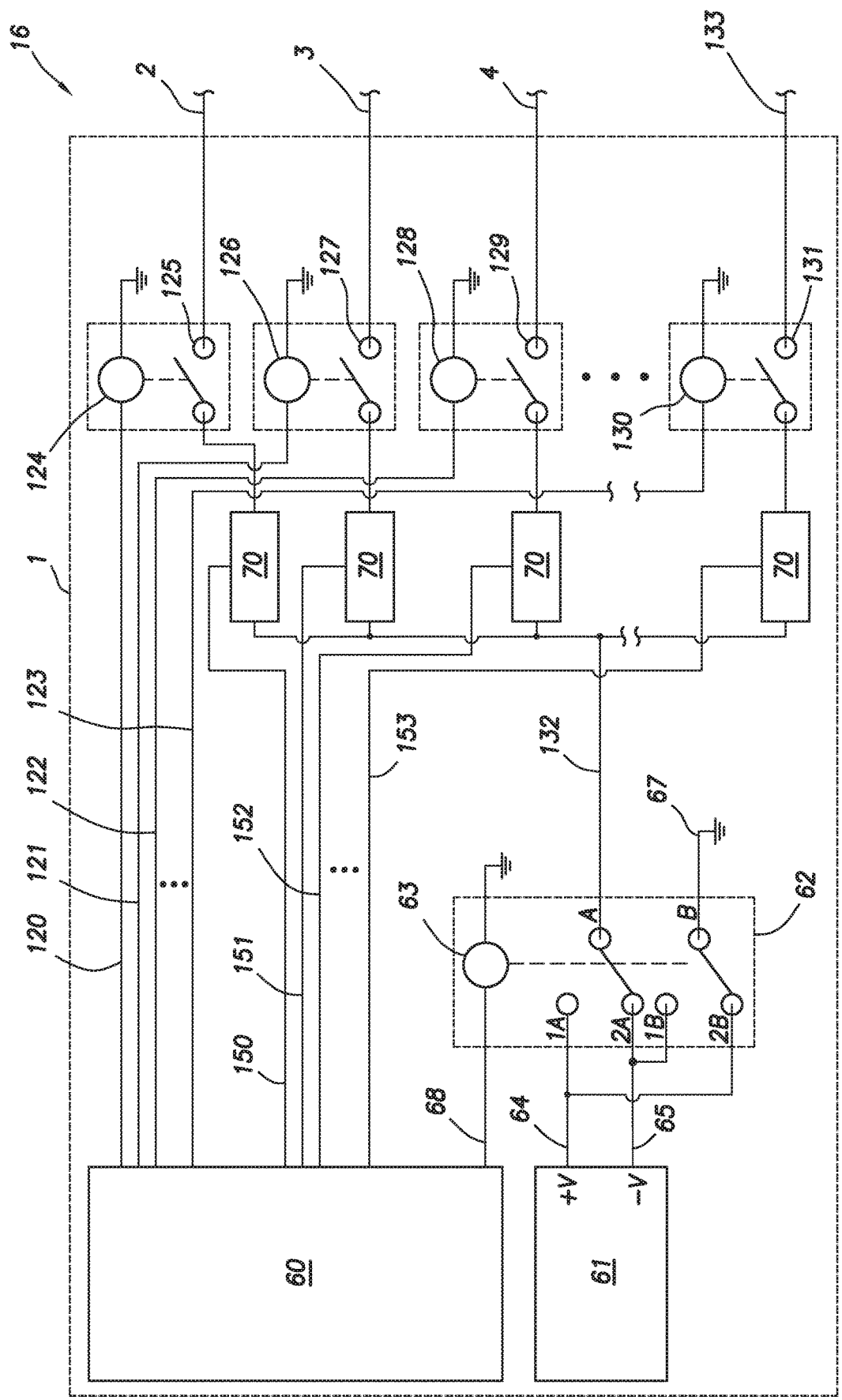
FIG. 6 is a representative schematic view of another example of the system, in which multiple current sensors are used with multiple downhole well tools.

Referring additionally now to FIG. 6, another example of the system 16 is representatively illustrated. In this example, a separate current sensor 70 is connected between the direction relay 63 output 132 and each respective relay coil 124, 126, 128, 130.

Outputs of the current sensors 70 are communicated to the computer 60 via respective conductors 150, 151, 152, 153. As a result, a unique power draw can be recorded by the computer 60 for each individual conductor 2, 3, 4, 133, even if multiple ICVs 9-12 are actuated simultaneously.

Figure 7:
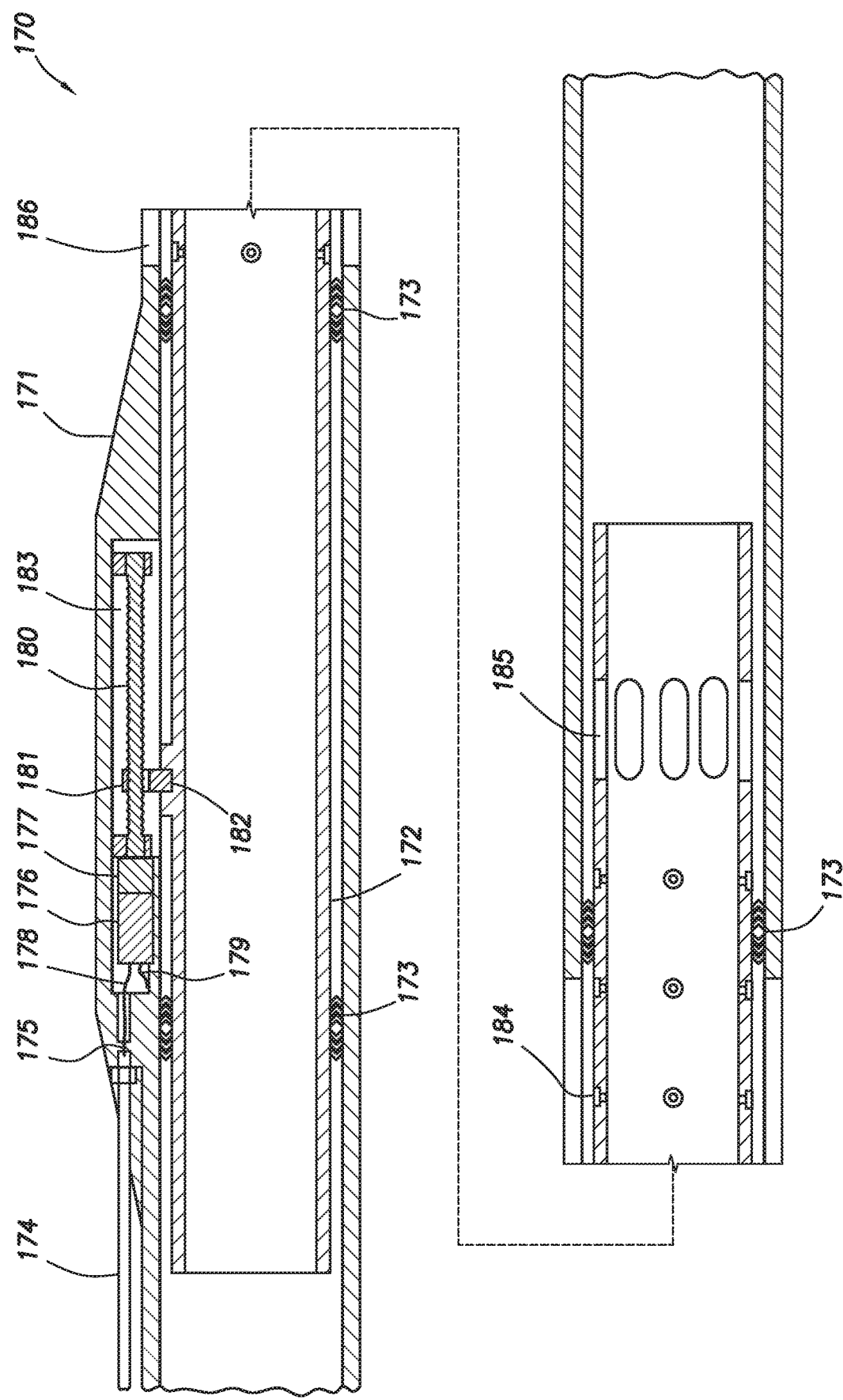
FIG. 7 is a representative cross-sectional view of an example of a downhole well tool that may embody the principles of this disclosure.

Referring additionally now to FIG. 7, a simplified cross-sectional view of an example of an interval control valve 170 is representatively illustrated. The FIG. 7 interval control valve 170 may be used for any of the downhole flow control or interval control valves described herein. The FIG. 7 interval control valve 170 may be used in the system 16 and method, or it may be used with other systems and methods.

In the FIG. 7 example, the ICV 170 includes a housing 171, an inner sleeve 172 and seals 173. The seals 173 isolate the tubing (e.g., the interior of the tubular string 23) from the annulus (e.g., an annulus formed between the tubular string 23 and the casing 24), and isolate a pressure compensated chamber 183 from the tubing. When housing flow ports 186 are aligned with inner sleeve flow ports 185, the ICV 170 allows full-open communication between the tubing and annulus (e.g., between the interior and the exterior of the ICV 170).

The inner sleeve 172 is one example of a closure member that may be displaced when a downhole valve is actuated. In this example, the inner sleeve 172 closes off or otherwise blocks flow through the housing flow ports 186 in a closed position, and permits flow through the housing flow ports in an open position. Other types of members may be displaced, and the member may be displaced to other positions, in other downhole well tools incorporating the principles of this disclosure.

In the FIG. 7 example, a single conductor TEC 174 supplies power to the ICV 170 from the system controller 1. A pressure bulkhead feedthrough 175 provides pressure isolation between the pressure compensated chamber 183 and an interior of the TEC 174. The single conductor 178 of the TEC 174 is connected to one pole of a brushed DC motor 176, and a second contact of the motor is connected to ground at point 179.

The DC motor 176 drives a planetary gear box 177, which in turn rotates a ball screw 180. Rotation of the ball screw 180 produces linear motion of a ball nut 181, which is connected to the valve inner sleeve 172 by means of a load yoke or load lug 182. Thus, the inner sleeve 172 can be displaced to block or permit flow through the ports 185, 186 by applying DC power to the motor 176.

A longitudinal direction of the inner sleeve 172 displacement corresponds to a polarity of the DC power applied to the motor 176. By switching the polarity (such as described above for the FIGS. 3A, 3B, 4A, 4B, 5 and 6 examples), the valve inner sleeve 172 displacement direction can be reversed.

Two configurations of the ICV 170 are full open and full closed. These positions are reached in this example when the inner sleeve 172 bottoms-out at either end of its stroke. In some examples (such as, a multi-position, or choking ICV), the inner sleeve 172 can incorporate additional ports or orifices 184 that can align with the housing ports 186 when the inner sleeve is in-between its full open and full closed positions. These in-between positions can be used to limit a flow area through the valve 170, which enables a unique desirable restricted, or choked, flow depending on what intermediate position is selected.

In other examples, the orifices 184 could instead be formed through the housing 171, so that the flow ports 185 are gradually placed in communication with the orifices 184 as the inner sleeve 172 displaces relative to the housing 171. The scope of this disclosure is not limited to any particular configuration or arrangement of the orifices 184 or flow ports 185, 186 in the interval control valve 170.

Figure 8:
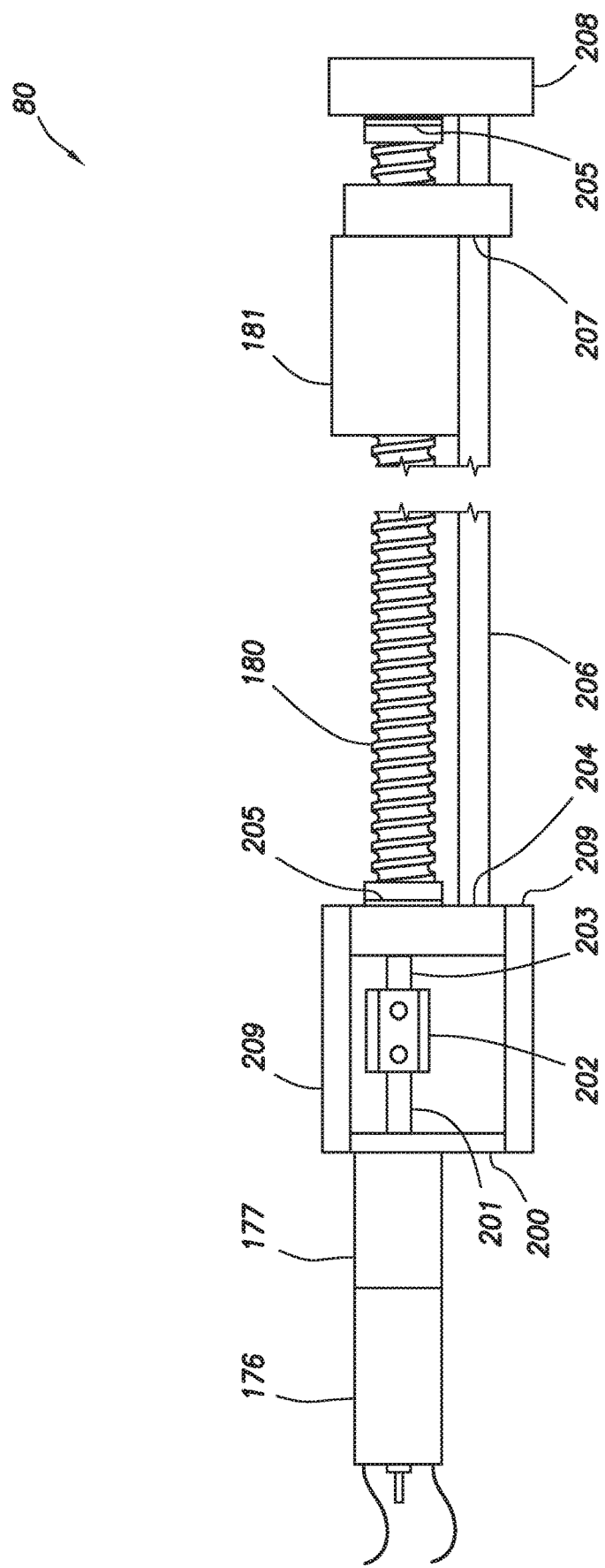
FIGS. 8-11 are representative side views of different motor and ball screw arrangements that may be used in an actuator assembly of the downhole well tool.

Referring additionally now to FIG. 8, a more detailed side view of an example of an actuator assembly 80 is representatively illustrated. The actuator assembly 80 may be used with any of the downhole flow control or interval flow control valves described herein, or it may be used to actuate other types of downhole valves or flow control devices. For convenience, the actuator assembly 80 is described below as it may be used with the FIG. 7 ICV 170.

In the FIG. 8 example, the actuator assembly 80 includes the brushed DC motor 176, the planetary gearbox 177, and a gearbox shaft 201 that is connected to a ball screw shaft 203 and the ball screw 180 by means of a coupler 202. These components are assembled together by means of a torque plate 200, a motor end support 204 and support bars 209.

The actuator assembly 80 further includes bearings 205 to support axial and radial loads at ends of the ball screw 180. An end support 208 is securely mounted to the housing 171 (see FIG. 7) to transfer linear loads to a main body of the ICV 170.

The ball nut 181 transfers liner motion to the inner sleeve 172. A load yoke 207 is rigidly connected to the ball nut 181 and slides along a static position indicator bar 206. The position indicator bar 206 is in the shape of an elongated shaft in this example. The load yoke 207 and ball nut 181 are the only components that move linearly in this example, and their displacement direction is determined by the polarity of the power supplied to the DC motor 176.

As used herein, the term "load yoke" is used to indicate a member or structure that connects the actuator assembly 80 to a member of a downhole well tool (such as the inner sleeve 172) to be displaced by the actuator assembly. In the FIG. 8 example, the load yoke 207 connects the ball nut 181 of the actuator assembly 80 to the inner sleeve 172, so that the actuator assembly 80 can displace the inner sleeve.

Figure 9:
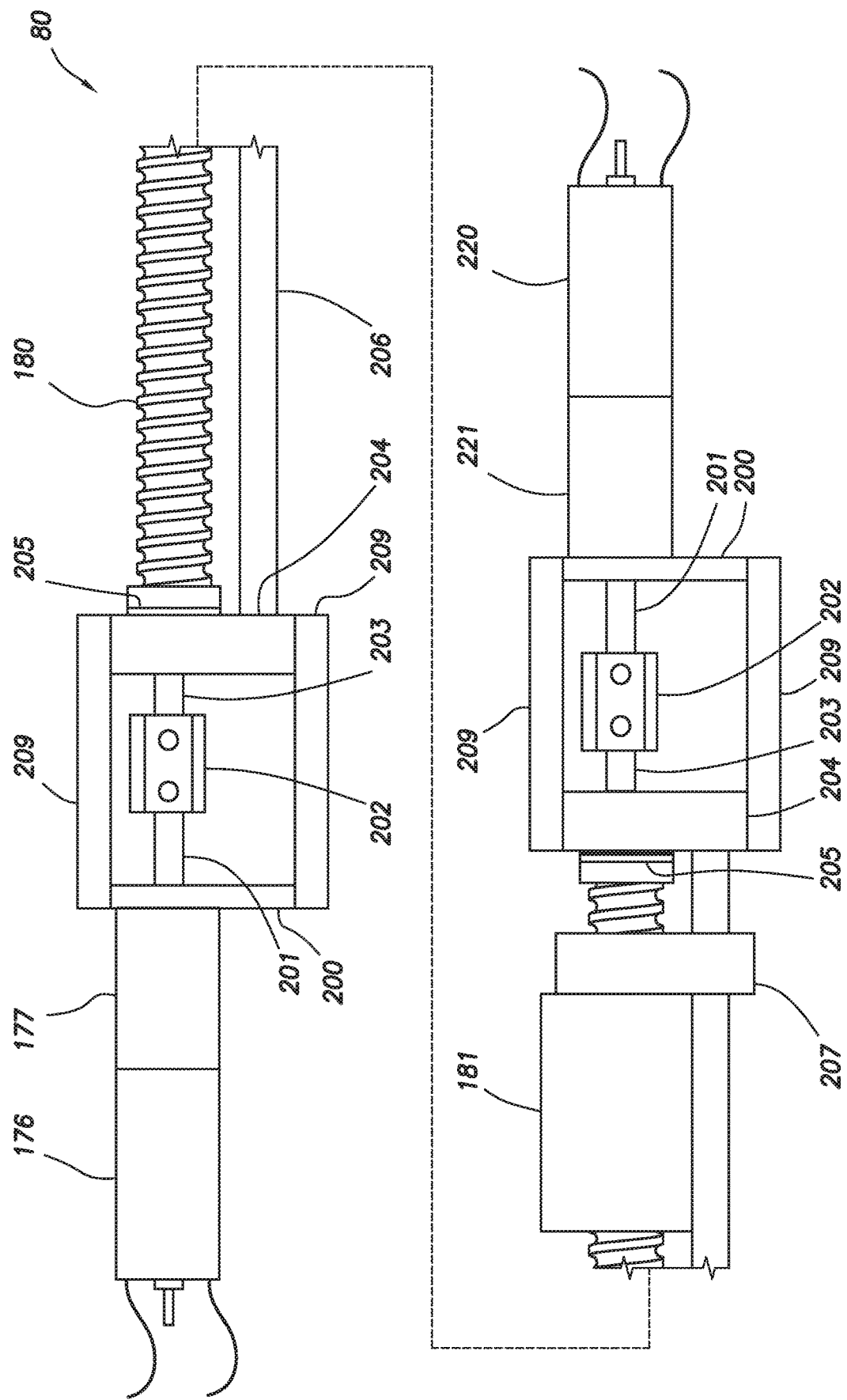

Referring additionally now to FIG. 9, another example of the actuator assembly 80 is representatively illustrated. In this example, the actuator assembly includes a second DC motor 220 and planetary gearbox 221. For support and connection to the ball screw 180, the FIG. 9 actuator assembly 80 also includes an additional coupler 202, torque plate 200, motor end support 204 and support bars 209.

In the FIG. 9 example, the DC motors 176 and 220 rotate and face in opposite directions, and thus cooperate to rotate the ball screw 180 in a same direction. One purpose of this dual-motor example is to provide higher linear shifting forces when desired or required. An associated benefit is that linear and rotational loads are distributed over twice as many components, which reduces the wear on each of those components.

Another purpose of the dual-motor design is to provide redundancy should one of the motors 176, 220 or gear boxes 177, 221 cease to operate. As such, both DC motors 176, 220 can be powered by a single conductor (such as the conductor 178), or each can be powered by a separate conductor.

Figure 10:
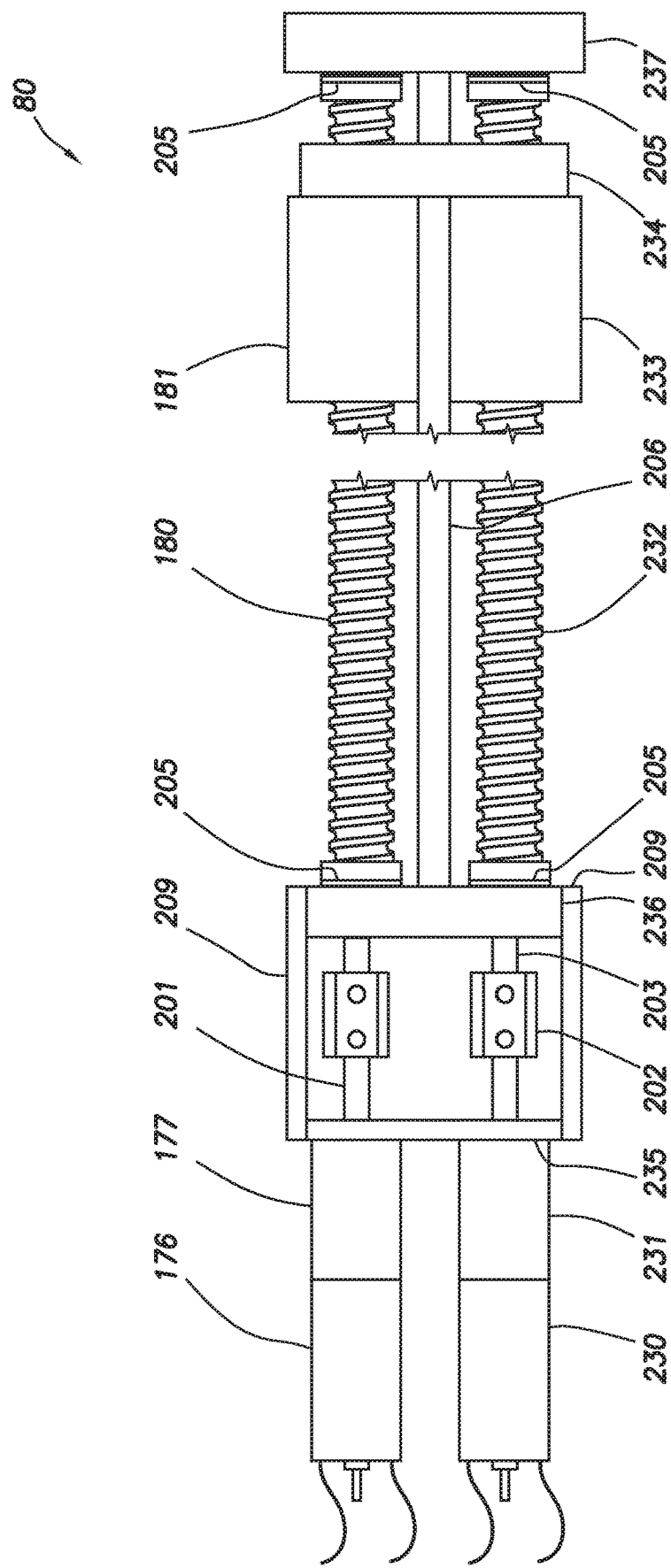

Referring additionally now to FIG. 10, another example of the actuator assembly 80 is representatively illustrated. In this example, the actuator assembly 80 includes two DC motors 176, 230 for rotating two respective ball screws 180, 232.

As depicted in FIG. 8, the motors 176, 230 and ball screws 180, 232 are arranged in parallel. Both DC motors 176, 230, planetary gear boxes 177, 231 and ball screws 180, 232 rotate in the same direction when DC power is applied to the motors.

Instead of the load yoke 207 of the FIGS. 8 & 9 examples, a dual load yoke 234 is rigidly connected to ball nuts 181, 233 on the respective ball screws 180, 232. The position indicator bar 206 is placed between the two ball screws 180, 232, and the dual load yoke 207 slides along the length of it.

As in the FIG. 9 example, the FIG. 10 dual-motor example of the actuator assembly 80 provides higher linear shifting forces, enhanced distribution of linear and radial loads across a higher number of components, and provides redundancy should one of the motors or gear boxes cease to operate. Both of the DC motors 176, 230 can be supplied power via a single conductor, or each motor can be powered by a separate conductor.

Figure 11:
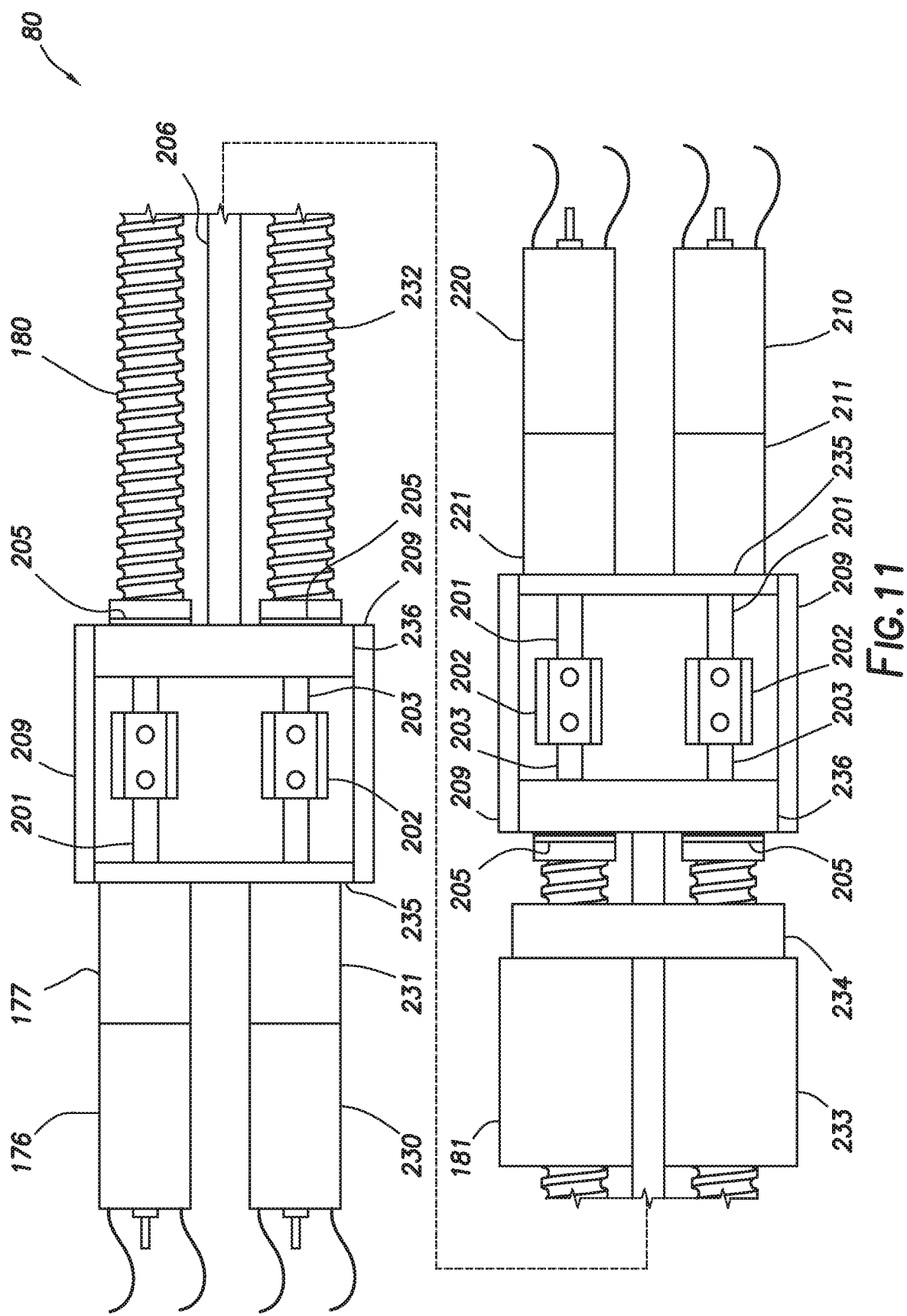

Referring additionally now to FIG. 11, another example of the actuator assembly 80 is representatively illustrated. The FIG. 11 actuator assembly 80 basically combines features of the FIGS. 9 & 10 examples, so that a total of four DC motors 176, 210, 220, 230 and four planetary gearboxes 177, 211, 221, 231 are provided, connected in series and in parallel. Two ball screws 180, 232, two ball nuts 181, 233, the dual load yoke 234, the position indicator bar 206 and four bearings 205 are also used in the FIG. 11 actuator assembly 80.

The FIG. 11 actuator assembly 80 configuration further increases the linear shifting forces output by the actuator assembly. As mentioned above for the dual-motor examples, linear and rotational loads are distributed over an even larger number of components, thus further enhancing the life expectancy of each of the components. The four DC motors 176, 210, 220, 230 can be powered by a single conductor, or any set of two can be powered by a separate conductor.

In the examples depicted in the drawings, the bearings 205 are positioned between the ball screws 180, 232 and a motor end support 204, 236 connected to the support bars 209. In this configuration, the ball screws 180, 232 are placed in compression while displacing the yoke 207, 234. In other examples, the bearings 205 may be positioned between the gear box 177, 231, 221, 211 and a torque plate 200, 235 connected to the support bars 209, so that the ball screws 180, 232 are placed in tension while displacing the yoke 207, 234.

It is advantageous to have position feedback from a downhole flow control or interval control valve during actuation to enable an operator and/or the system controller 1 to determine where the valve is (e.g., a position of the inner sleeve 172 in the FIG. 7 ICV 170) during the actuation process. This is particularly important for a choking-type ICV as it allows the ICV actuation to be stopped at a desired choking setting (e.g., with a desired restriction to flow) and provides positive feedback to the system controller 1 and operator that the valve is in the correct choking configuration. The present specification provides such a position indicating capability.

One embodiment utilizes a signal modulated on the motor current to indicate the valve position. Referring again to the FIG. 8 example, the position indicator bar 206 is mounted parallel to the ball screw 180, with ends of the position indicator bar fixed into the end supports 204, 208. The position indicator bar 206 passes through a bore in the load yoke 207. As the valve 170 is actuated, the load yoke 207 displaces longitudinally with the ball nut 181. Thus, as the actuator assembly 80 displaces the inner sleeve 172 between positions relative to the housing 171, the load yoke 207 translates along the length of the position indicator bar 206.

Figure 12:
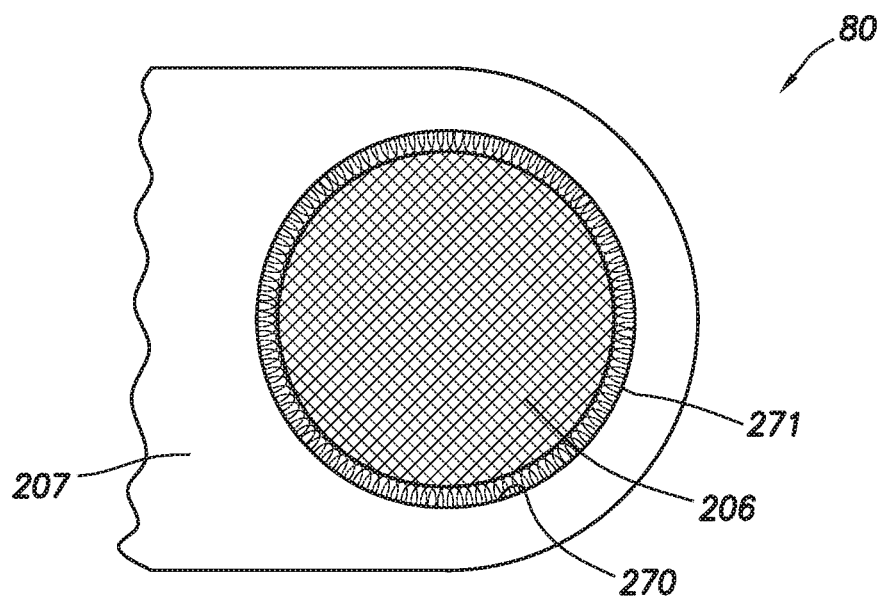
FIG. 12 is a representative partially cross-sectional view of an example of a load yoke positioned on a position indicator bar of the actuator assembly.

Referring additionally now to FIG. 12, an end view of the load yoke 207 is representatively illustrated. In this view, the position indicator bar 206 is depicted as being slidingly and reciprocably received in a bore 270 of the load yoke 207.

A garter spring 271 is carried in the load yoke 207, so that the garter spring extends about the position indicator bar 206 and can slidingly contact an external surface of the position indicator bar. As the load yoke 207 displaces longitudinally relative to the position indicator bar 206, the garter spring 271 can drag along the external surface of the position indicator bar.

By changing an amount of compression of the garter spring 271 between the load yoke bore 270 and the external surface of the position indicator bar 206, friction between the garter spring and the position indicator bar is changed and, thus, a load on the motor 176 is changed, thereby causing a change in motor current monitored by the system controller 1. The current sensor 70 (see FIGS. 3A-6) can be used to sense the current in the conductors 2, 3, 4, 133 used to provide DC power to the motor 176 (or any number of motors 176, 210, 220, 230).

Figure 13:
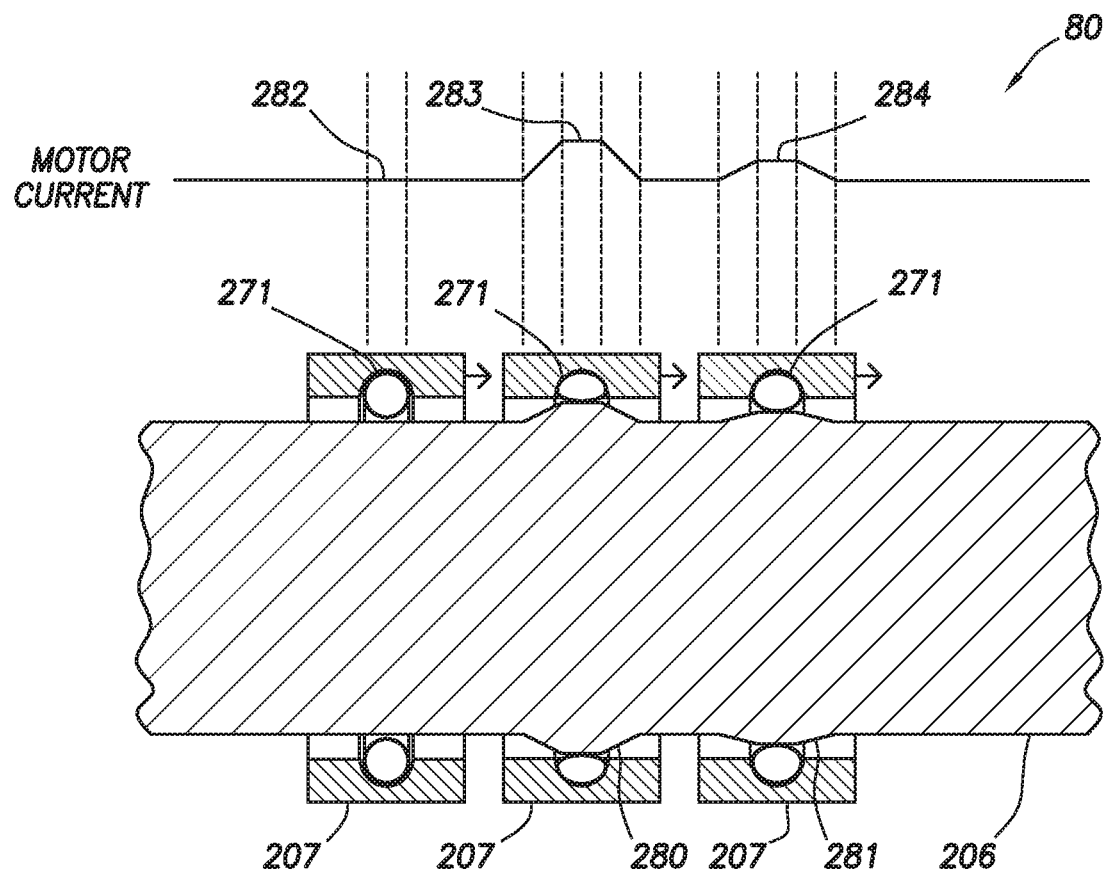
FIGS. 13-16 are representative cross-sectional views of the load yoke and position indicator bar, with the load yoke in different positions relative to profiles on the position indicator bar, and with a graph of motor current corresponding to the different positions.

A variety of different motor current patterns or "signatures" can be used to indicate the valve position (e.g., a position of the inner sleeve 172 relative to the housing 171 in the FIG. 7 ICV 170). Referring additionally now to FIG. 13, an example motor current pattern that can be used to indicate valve position is representatively illustrated. In FIG. 13, a cross-sectional view of a section of the position indicator bar 206 is depicted with the load yoke 207 in a succession of three longitudinal positions relative to the position indicator bar. A monitored level of motor current at each of the positions is depicted in graph form above the position indicator bar 206.

As the load yoke 207 moves along a section of the position indicator bar 206 with a nominal reduced diameter, there is minimal friction between the garter spring 270 and the shaft external surface. A baseline motor current 282 is monitored at the surface controller 1 at this point. In this example, the baseline motor current 282 is the motor current needed to displace the inner sleeve 172 and overcome nominal friction in the actuator assembly 80 and the ICV 170 itself. Friction due to the seals 173 (see FIG. 7) is a primary component in the load the motor 176 exerts at this point.

As the load yoke 207 continues moving along the position indicator bar 206, it eventually encounters a radially enlarged profile 280 on the shaft. This causes the garter spring 271 to be squeezed and friction between the garter spring and the position indicator bar 206 to increase. This places an increased load on the motor 176 and directly corresponds with an increased motor current 283 monitored by the surface controller 1.

Current in the brushed DC motor or motors 176, 210, 220, 230 may be noisy due, for example, to electrical noise from commutation and small variations in friction as the valve inner sleeve 172 moves. The commutation noise is at a much higher frequency than the current changes produced by the position indicator bar 206 and can be removed by appropriate filtering. The friction changes produced by the garter spring 270 traversing the raised profile 280 can be selected to be much greater than normal actuation friction changes, in order to ensure that the friction changes produced by the garter spring traversing the raised profile are identifiable.

As the load yoke 207 continues moving along the position indicator bar 206, it disengages from the profile 280 and then it eventually encounters another radially enlarged profile 281 on the shaft. This causes the garter spring 271 to be squeezed and friction between the garter spring and the position indicator bar 206 to increase. This places an increased load on the motor 176 and directly corresponds with another increased motor current 284 monitored by the surface controller 1.

The profile 281 is not as radially enlarged as the profile 280 and, thus, the motor current 284 is less than the motor current 283, but is greater than the baseline motor current 282. In this manner, different levels of motor current can be used to indicate respective different positions of the load yoke 207 relative to the position indicator bar 206 (and, thus, respective different positions of the inner sleeve 172 relative to the housing 171).

Figure 14:
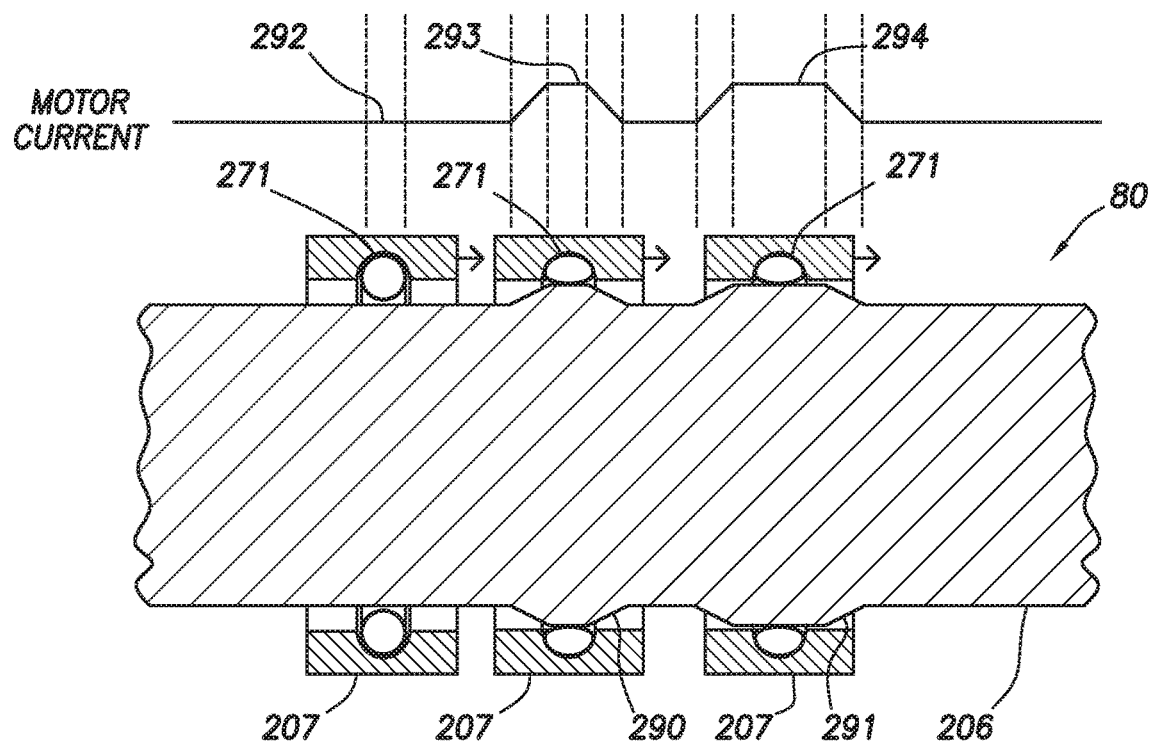

Referring additionally now to FIG. 14, another example of the position indicator bar 206 and load yoke 207 is representatively illustrated. In this example, radially enlarged profiles 290, 291 on the position indicator bar 206 have different widths (lengths along the position indicator bar).

Thus, as the load yoke 207 displaces along the position indicator bar 206, the friction between the garter spring 271 and the external surface of the position indicator bar will increase for different durations of time, depending on the width of the profile 290, 291 engaged by the garter spring. In this manner, different durations of increased motor current can be used to indicate respective different positions of the load yoke 207 relative to the position indicator bar 206 (and, thus, respective different positions of the inner sleeve 172 relative to the housing 171).

Figure 15:
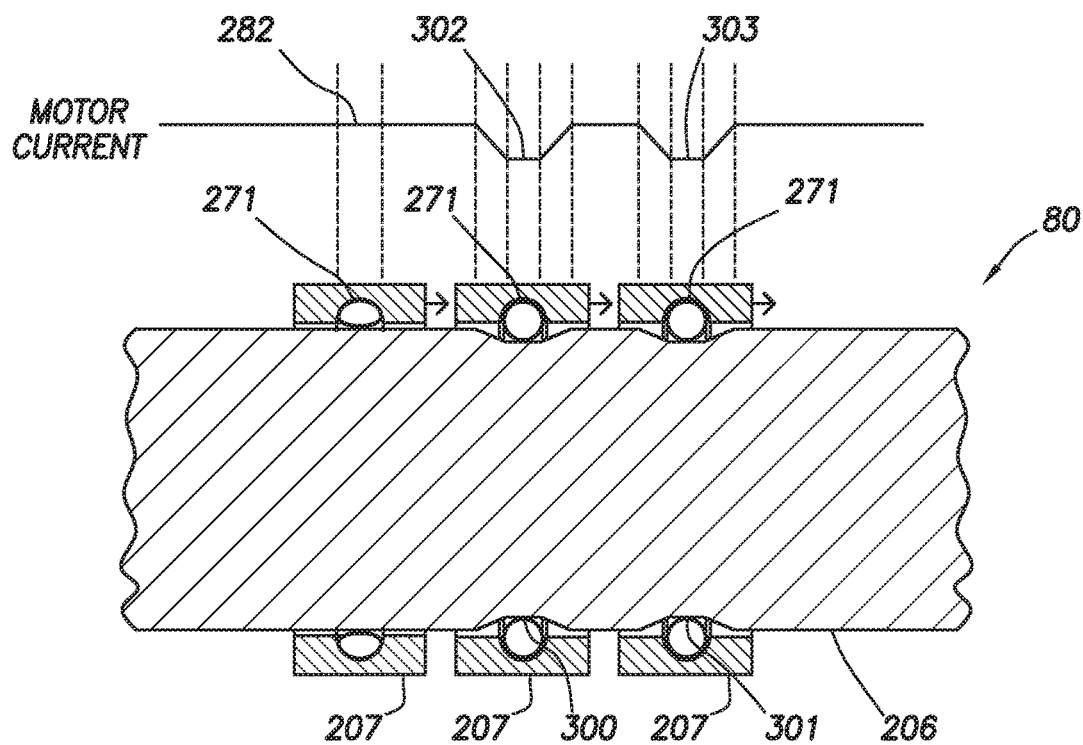

Referring additionally now to FIG. 15, another example of the position indicator bar 206 and load yoke 207 is representatively illustrated. In this example, the garter spring 271 continuously drags on the external surface of the shaft 206 at its nominal diameter, which increases the load on the motor 176, so that the baseline motor current 282 is increased as compared to the FIGS. 13 & 14 examples.

The position indicator bar 206 has multiple radially reduced profiles 300, 301 formed on its external surface. As the load yoke 207 traverses each of the profiles 300, 301, friction between the garter spring 271 and the external surface of the position indicator bar 206 is decreased, thereby decreasing the load on the motor 176 as indicated by the decreased motor current at 302, 303. In this manner, a series of decreased motor currents can be used to indicate respective different positions of the load yoke 207 relative to the position indicator bar 206 (and, thus, respective different positions of the inner sleeve 172 relative to the housing 171).

Any of the methods depicted in FIGS. 13-15 may be used individually or combined, for valve position indication.

Figure 16:
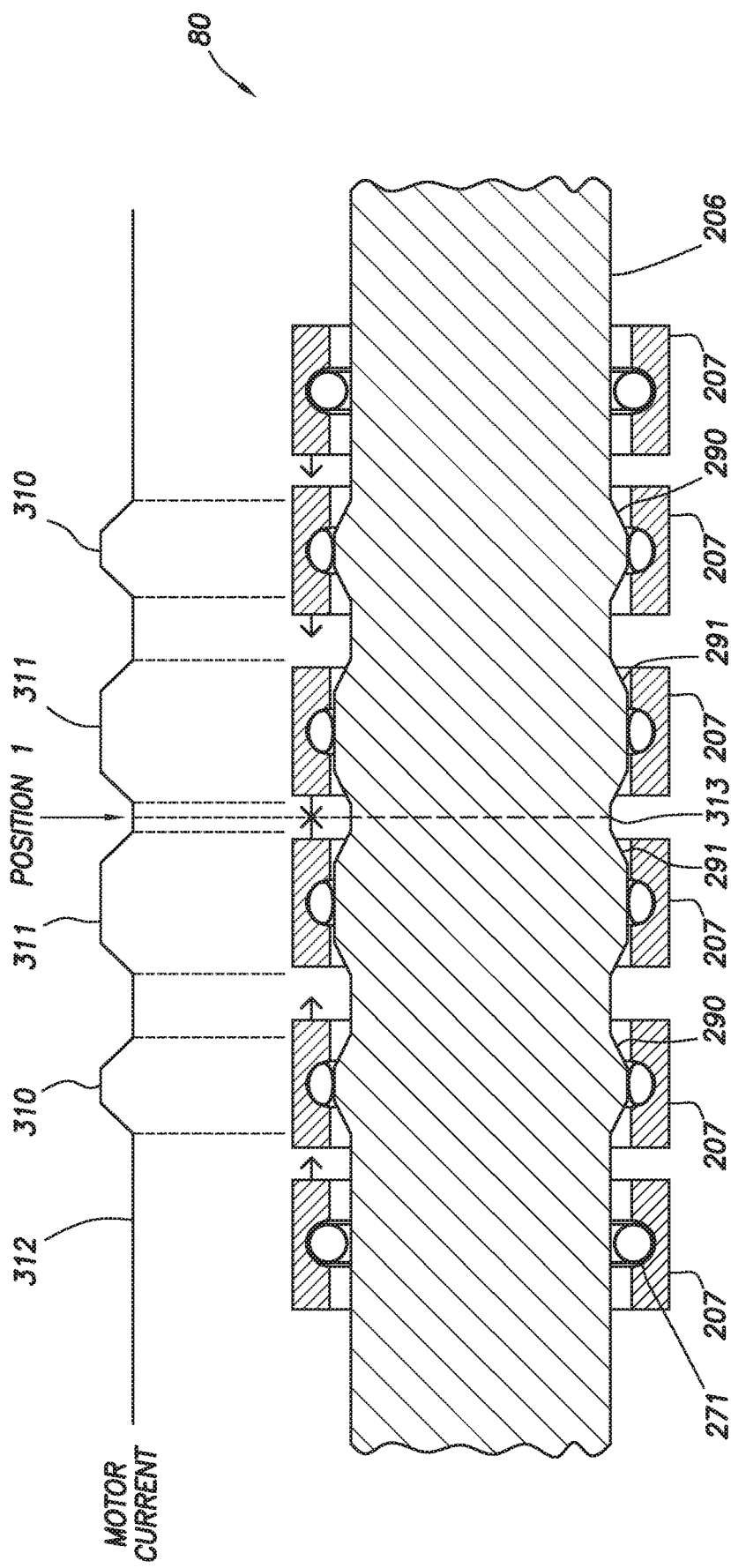

Referring additionally now to FIG. 16, an example of how different motor current durations as depicted in FIG. 14 may be used to indicate a specific valve position and allow the surface controller 1 to stop the actuation at the correct location for the desired valve position is representatively illustrated. In this example, a valve position 1 is represented by a unique identifier consisting of a short current increase 310 followed by a long current increase 311 as the load yoke 207 displaces to the right as viewed in FIG. 16. Other valve positions have respective different unique position identifiers.

The valve (such as the ICV 170 of FIG. 7) actuates in two longitudinal directions, in this example, either an open-to-closed direction, or a closed-to-open direction. Preferably, the position indication is determinable, with the load yoke 207 translating in either direction relative to the position indicator bar 206.

In FIG. 16, valve position 1 (point 313) is indicated on position indicator bar 206. On each side of point 313, there is a relatively wide radially increased profile 291 and then a relatively narrow radially increased profile 290. During actuation, when approaching valve position 1 from either direction, the garter spring 271 in the load yoke 207 will encounter the narrow profile 290 followed by the wide profile 291. The system controller 1 will detect the relatively short current increase 310, followed by the relatively long current increase 311, indicating that the valve is close to position 1.

When the current at the long current increase 311 decreases back to a baseline current 312, this indicates to the surface controller 1 that the valve has reached position 1. The system controller 1 will cut off power to the actuator assembly 80 to stop actuation of the valve 170 if this is the target position. When the valve 170 is actuated to another position, the system controller 1 will immediately detect the long current increase 311, followed by the short current increase 310, providing a verification that the valve was previously in position 1.

Referring additionally now to FIGS. 17A-18B, another example of the actuator assembly 80 is representatively illustrated. In this example, a periodic current pulse or variation is modulated onto the motor current to indicate a distance the actuator assembly 80 has displaced the load yoke 207 and inner sleeve 172.

Figure 17A:
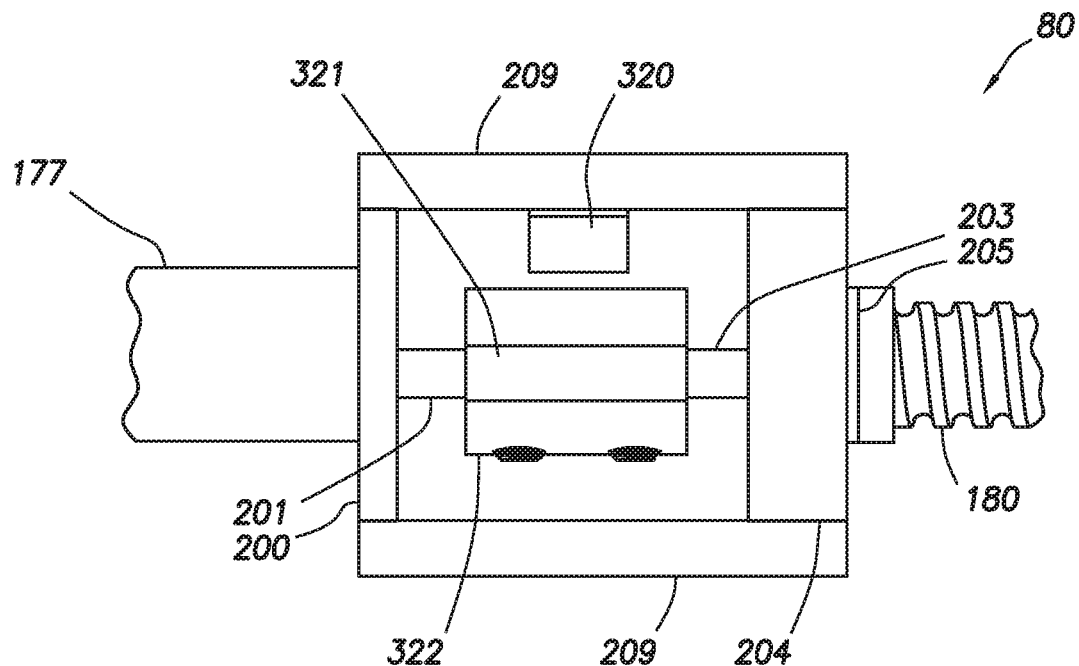
FIGS. 17A & B are representative side views of a portion of an example of the actuator assembly with a cam thereof in different rotational positions.
Figure 18A:
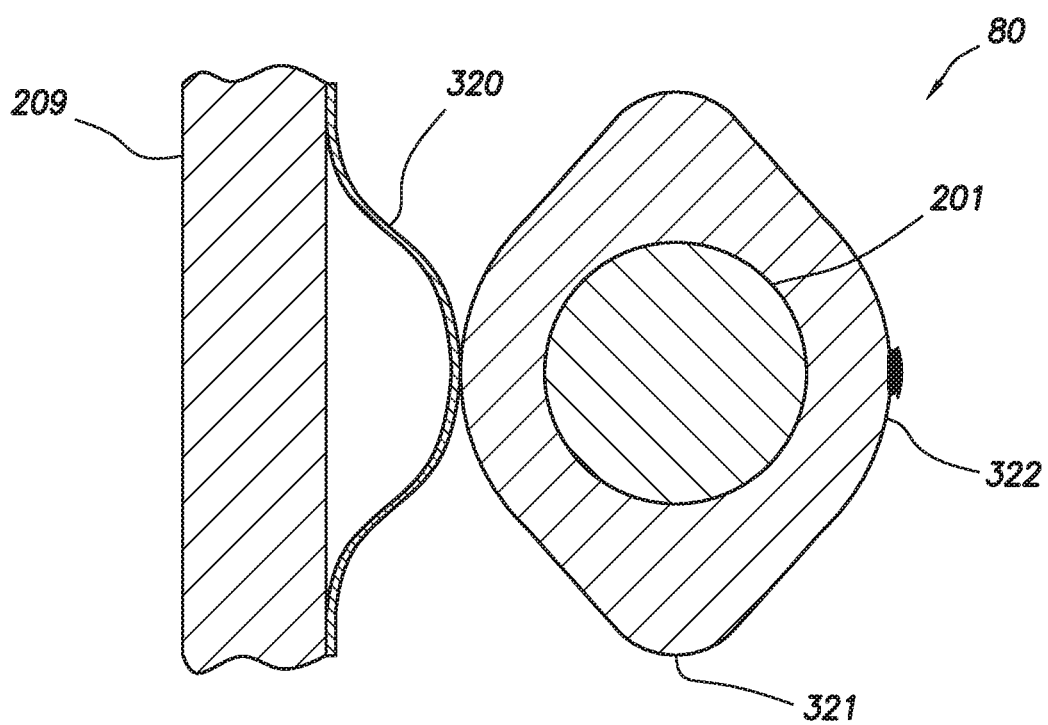
FIGS. 18A & B are representative cross-sectional views of the actuator assembly with the cam in different rotational positions.

In FIGS. 17A & 18A, an example of a coupling between the gearbox 177 and the ball screw 180 of the actuator assembly 80 is depicted. A coupler in the shape of a cam 322 connects the gearbox 177 to the ball screw 180 and is shaped with two cam lobes 321 located 180 degrees apart. A bow spring 320 is attached to one of the support bars 209. When the cam lobes 321 are located at right angles to the bow spring 320, the bow spring does not contact either of the cam lobes.

Figure 17B:
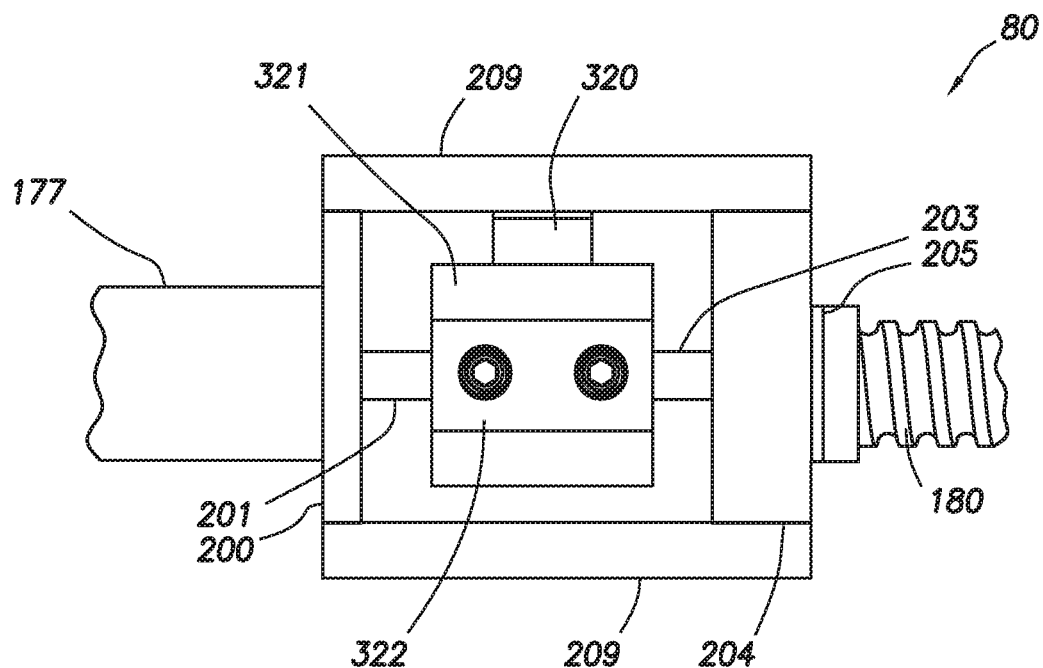
Figure 18B:
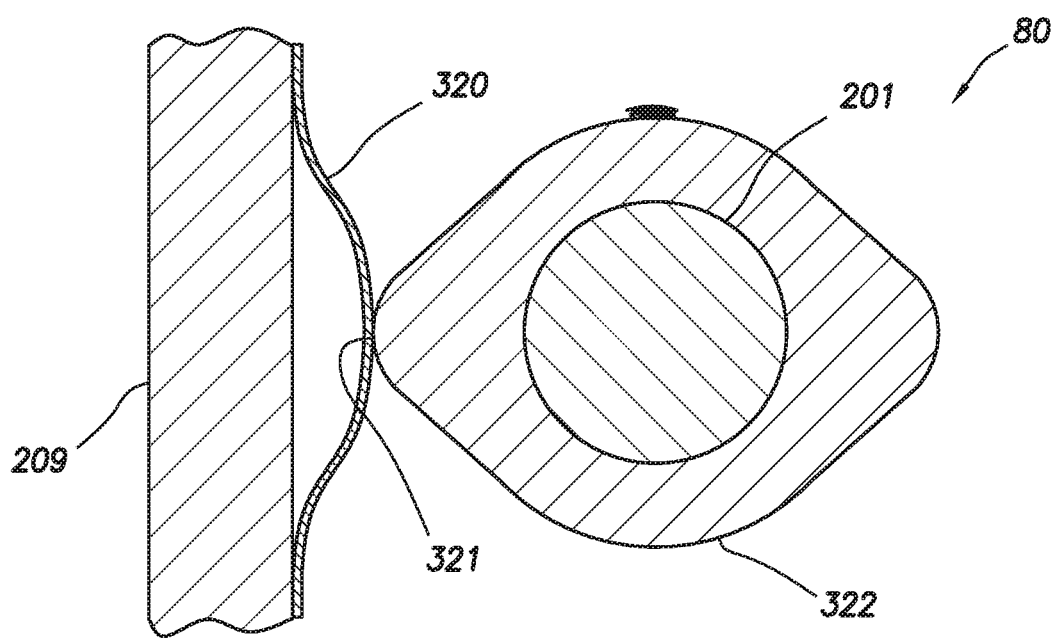

Referring to FIGS. 17B & 18B, as the cam 322 is driven by the motor 176 and gearbox 177, and rotates 90 degrees, one of the cam lobes 321 contacts and compresses the bow spring 320, thereby increasing load on the motor 176 (or motors 176, 210, 220, 230). This will show up as a pulse or increase in the motor current twice per revolution of the cam 322 and gearbox shaft 201. An amplitude of the current pulses is determined by a strength of the bow spring 320.

Figure 19:
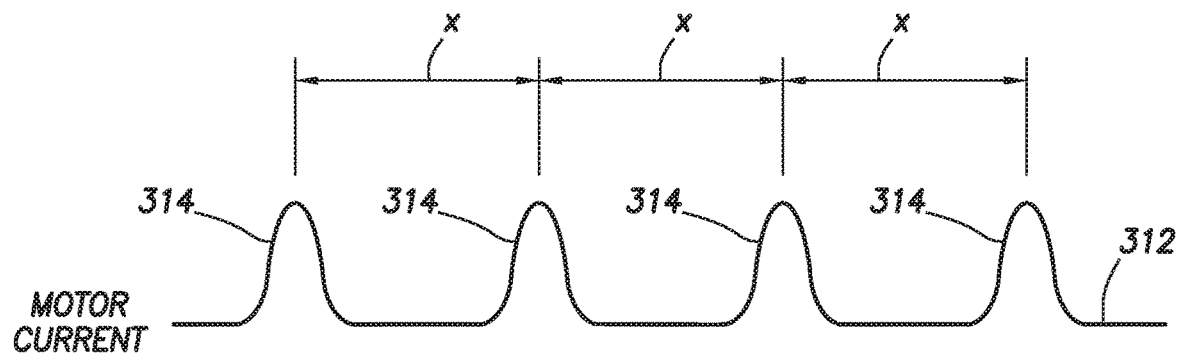
FIG. 19 is a representative graph of motor current versus time for the example of FIGS. 17A-18B.

Referring additionally now to FIG. 19, a series of periodic current increases or pulses 314 is representatively illustrated. The current pulses 314 are due to friction between the bow spring 320 and the cam lobes 321 as the cam 322 rotates with the gearbox shaft 201 as described above.

Each of the current pulses 314 directly corresponds to a specific longitudinal distance the actuator assembly 80 has displaced the valve inner sleeve 172. For an example of the ball screw 180 with a lead of 0.2 inches (~8 mm), the ball nut 181 moves the load yoke 207 and attached valve inner sleeve 172 0.2 inches (~8 mm) per revolution. With cam lobes 321 located 180 degrees apart, this corresponds to two current pulses 314 per revolution and 0.1 inches (~4 mm) of valve inner sleeve 172 movement per current pulse.

By counting current pulses 314, the system controller 1 can determine the exact position of the valve inner sleeve 172 as the ICV 170 is being actuated, and can stop the actuation when the valve inner sleeve reaches a target position. While this example uses two cam lobes, one cam lobe could be used to give a position resolution of 0.2 inches (~8 mm), or more lobes could be used to increase the position resolution.

Figure 20A:
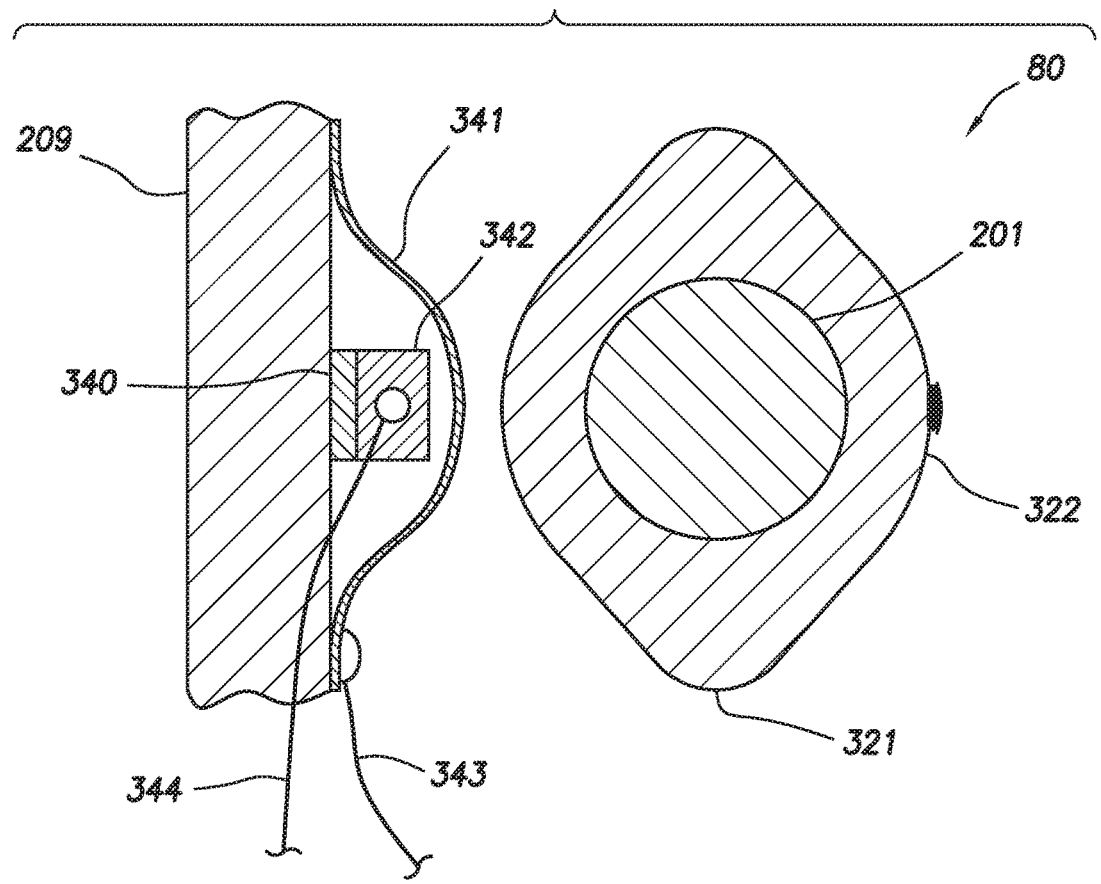
FIGS. 20A & B are representative cross-sectional views of the actuator assembly with the cam in different rotational positions relative to a bow spring and switch contact.

Referring additionally now to FIGS. 20A & B, cross-sectional views of another example of the actuator assembly 80 are representatively illustrated. In this example, rotation of the ball screw 180 is indicated without causing changes in the load on the motor 176.

As depicted in FIG. 20A, a conductive bow spring 341 and switch contact 342 are attached to one of the support bars 209. An insulator 340 provides electrical isolation of the switch contact 342 from the rest of the ICV 170 (such as, the housing 171, see FIG. 7).

The switch contact 342 is connected via a conductor 344 to the motor power conductor 2, 3, 4, 133 with an inline current limiting resister (not shown). The conductive bow spring 341 is connected to ground via a conductor 343.

Figure 20B:
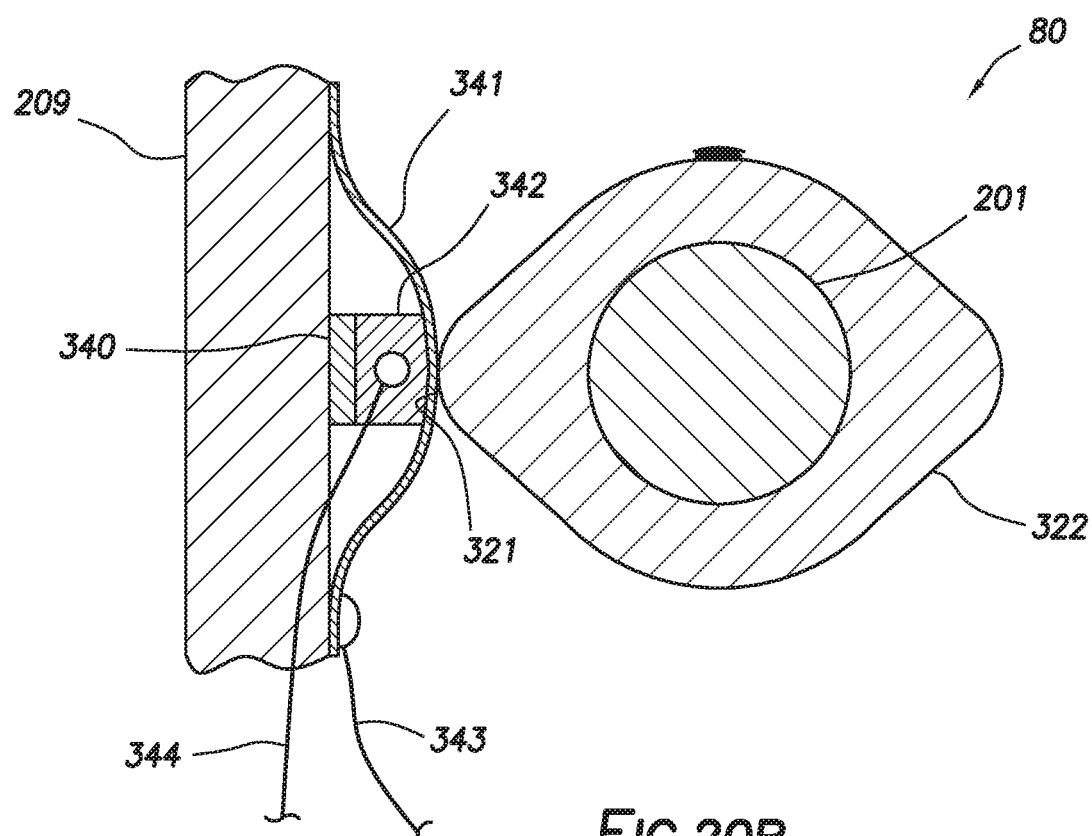

When a cam lobe 321 rotates into contact with the bow spring 341, as depicted in FIG. 20B it compresses the bow spring and makes electrical contact with the switch contact 342. This allows current to flow from the motor input to ground, thereby causing a pulse 314 in the motor current as depicted in FIG. 19. The amplitude of the current pulse 314 is determined by a value of the inline current limiting resister.

Similar to the FIGS. 17A-19 example, by counting current pulses 314, the system controller 1 can determine the exact position of the valve inner sleeve 172 as the ICV 170 is being actuated, and can stop the actuation when the valve inner sleeve reaches a target position. While this example uses two cam lobes, one cam lobe could be used to give less position resolution, or more lobes could be used to increase the position resolution.

Figure 21:
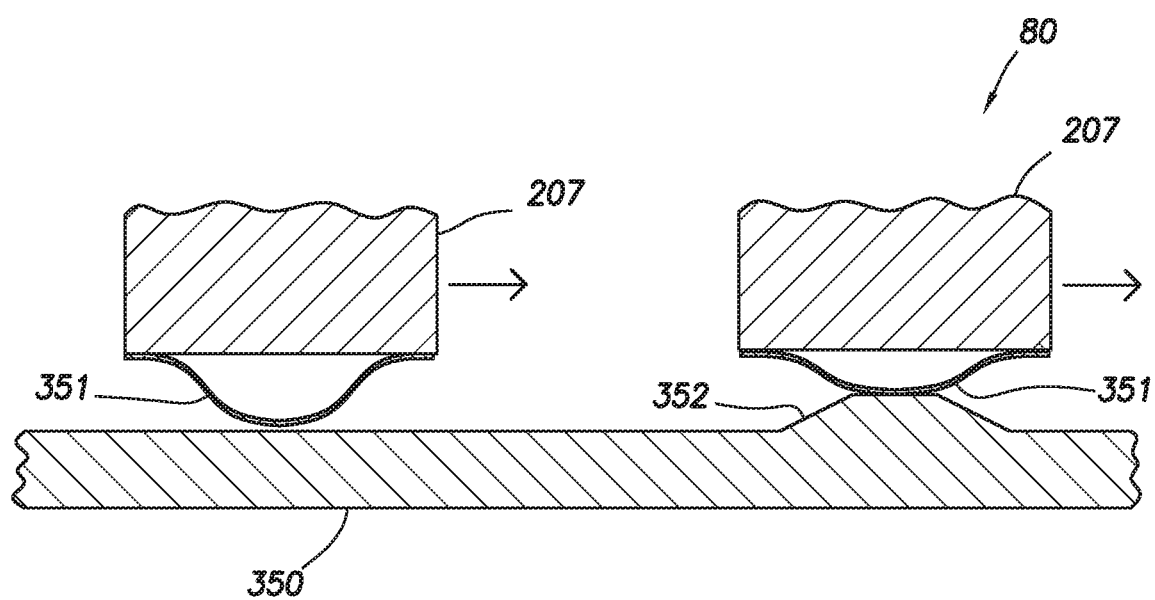
FIG. 21 is a representative cross-sectional view of a portion of another example of the actuator assembly.

Referring additionally now to FIG. 21, another example of the actuator assembly 80 is representatively illustrated. In this example, a position indicator bar 350 is used instead of the position indicator bar 206. The position indicator bar 350 is mounted parallel to the ball screw 180 (see FIG. 8), so that the load yoke 207 displaces longitudinally relative to the position indicator bar 350 as the ball screw is rotated by the motor 176 and gearbox 177.

On or more raised profiles 352 are formed on the position indicator bar 350. If multiple profiles 352 are used, they are longitudinally spaced apart on the position indicator bar 350.

A bow spring 351 is attached to the load yoke 207. As the load yoke 207 displaces relative to the position indicator bar 350, the bow spring 351 eventually contacts the raised profile 352, which compresses the bow spring. Increased friction due to this contact and compression of the bow spring 351 causes increased load on the motor 176 and, thus, increased motor current detectable by the system controller 1.

The profile(s) 352 can be located along the position indicator bar 350, so that each profile corresponds to a particular position of the valve inner sleeve 172 relative to the housing 171. The profiles 352 can have different widths or heights and may be arranged in different patterns, in order to provide for distinguishing the resulting current pulses from each other and thereby distinguishing the corresponding positions of the valve inner sleeve 172.

In another embodiment, a friction pad may be used in place of the bow spring 351 to generate the friction.

The position indicator concepts described above utilize detection of changes in motor current over noise that may be present in the motor current signal. Another embodiment utilizes a single conductor in the umbilical 25 for indicating position information for all the downhole flow control valves or ICVs in a well. This concept is applicable when actuating one valve at a time.

Figure 22:
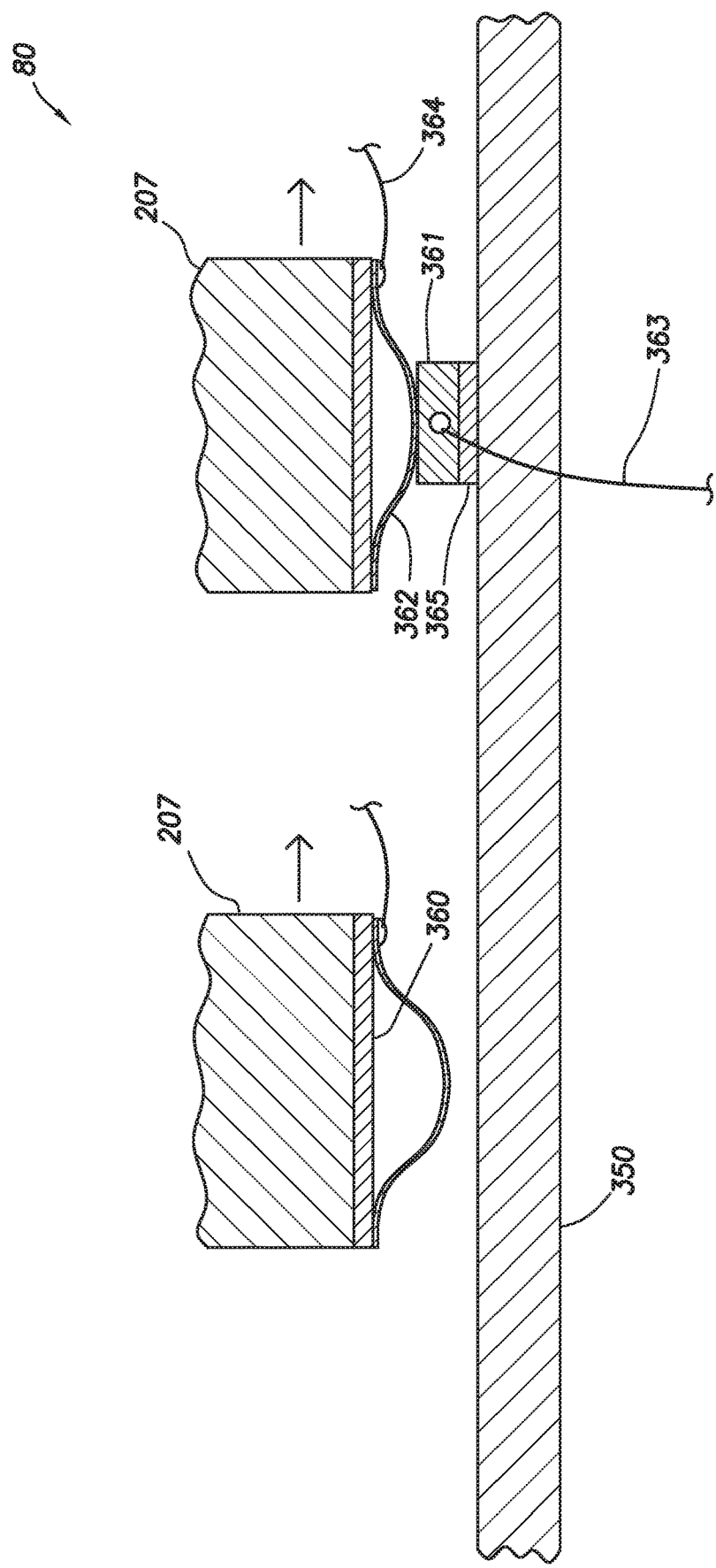
FIG. 22 is a representative cross-sectional view of a portion of another example of the actuator assembly.

Referring additionally now to FIG. 22, another example of the actuator assembly 80 is representatively illustrated. In this example, the position indicator bar 350 is located parallel to the ball screw 180, and one or more switch contacts 361 are located along the position indicator bar to correspond with predetermined valve positions.

As depicted in FIG. 22, a switch contact 361 is electrically isolated from the position indicator bar 350 by an insulator 365. As the load yoke 207 moves to a predetermined position, a conductive bow spring 362 makes contact with the switch contact 361, thereby completing an electrical circuit between the motor power and a common valve position indicator circuit through a power wire 363 and a position wire 364.

Figure 23:
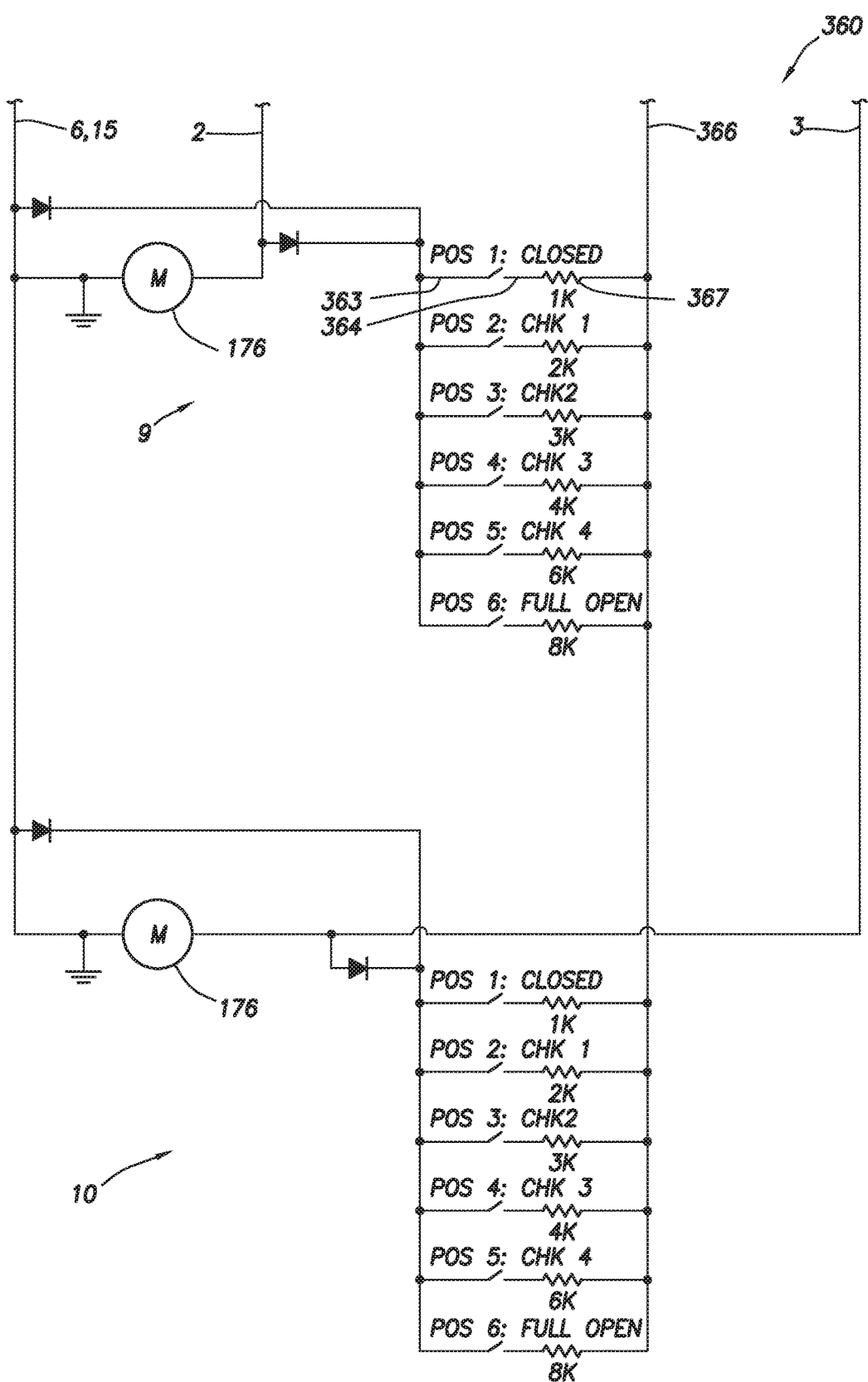
FIG. 23 is a representative schematic of an example of a position sensor circuit that may be used with the FIG. 22 actuator assembly.

Referring additionally now to FIG. 23, a schematic for a position sensor circuit 360 for a system including two ICVs 9, 10 is representatively illustrated. In this example, the position sensor circuit 360 includes six of the FIG. 22 switch contacts 361 longitudinally spaced apart along the position indicator bar 350 for each of the ICVs 9, 10, with each of the switch contacts corresponding to a predetermined position of the valve inner sleeve 172 relative to the housing 171.

This concept can be easily scaled for as many downhole flow control valves or ICVs are included in a completion. When power is supplied to an ICV motor 176, it is also supplied to the switch contact 361 at each valve position. When the switch contact 361 is contacted by the bow spring 362, the wires 363, 364 are electrically connected as described above, and current flows through a resistor 367 to a valve position conductor 366 in the umbilical 25.

The current limiting resistor 367 in the circuit 360 regulates the amount of current flowing to the valve position conductor 366. Different resistor 367 values at each position gives a unique current signature for each valve position that can be detected by the system controller 1.

Figure 24:
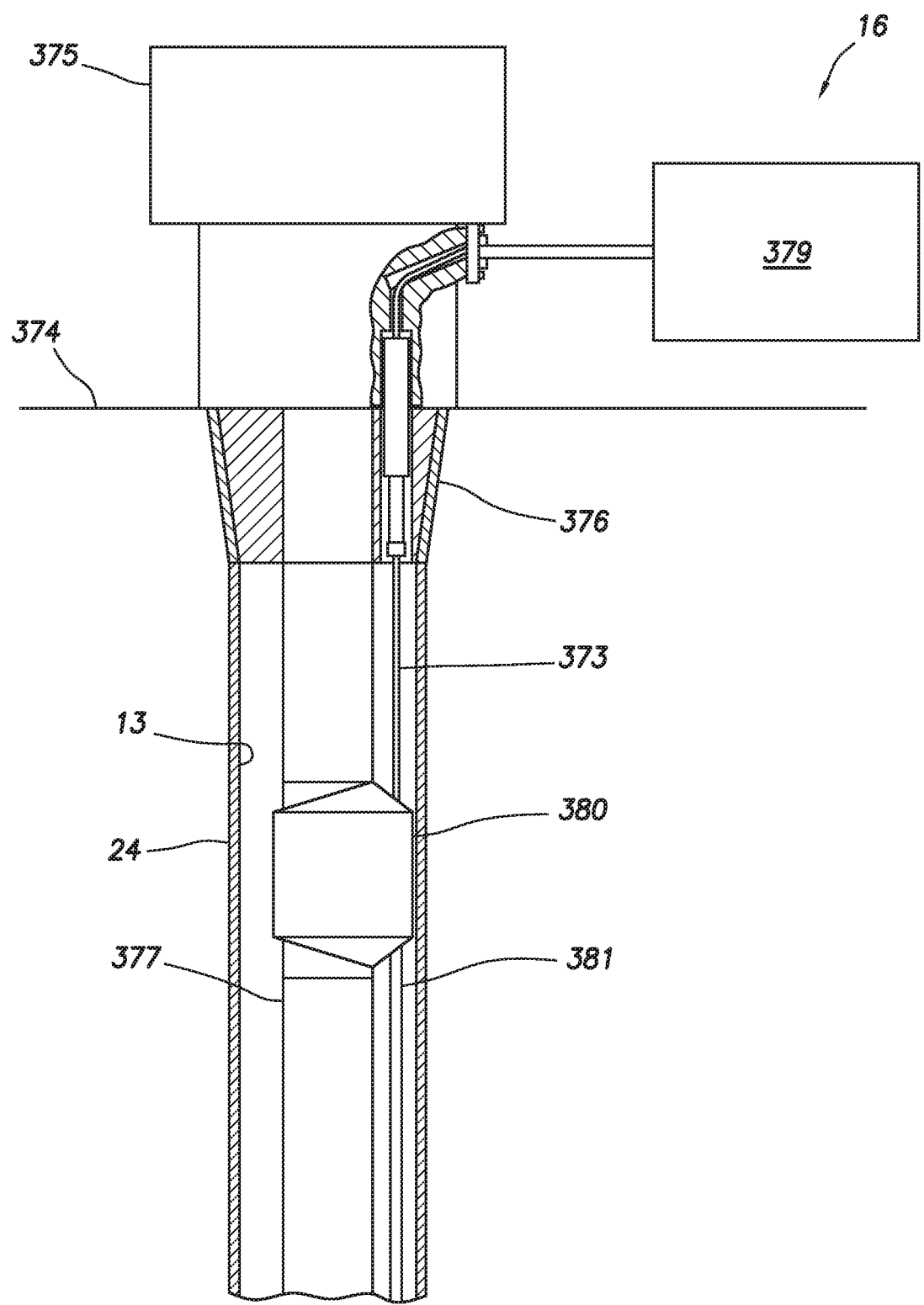
FIG. 24 is a representative partially cross-sectional view of another example of the well system and method for use with subsea wells.

In subsea applications there may be a limit on the number of electrical lines that can be routed through a subsea tubing hanger. In this case, the system controller 1 may be modified to meet this requirement. FIG. 24 depicts a system controller 1 example configuration for this application in a subsea example of the system 16.

A subsea controller 379 (including a power supply) is located on or near a seafloor 374. The controller 379 connects via subsea cables to a wellhead 375, and with a one or more conductor TEC 373 connects to an in-well system switching module 380 connected in a tubing string 377. A multi-conductor TEC 381 (such as the armored umbilical 25 of FIGS. 1 & 2) connects the switching module 380 to each of the downhole flow control valves or ICVs connected in the tubing string 377 below the switching module (such as, the ICVs 30, 33, 36, 39 connected in the tubular string 23 of FIG. 2).

The in-well switching module 380 is located toward a top of the well just below a tubing hanger 376 in this example. This location puts the module 380 in a relatively benign location in the wellbore 13, where temperatures and pressures are typically much less than at deeper locations where the downhole flow control valves or ICVs 9, 10, 11, 12 are installed. This enhances reliability of components in the in-well switching module 380.

Figure 25:
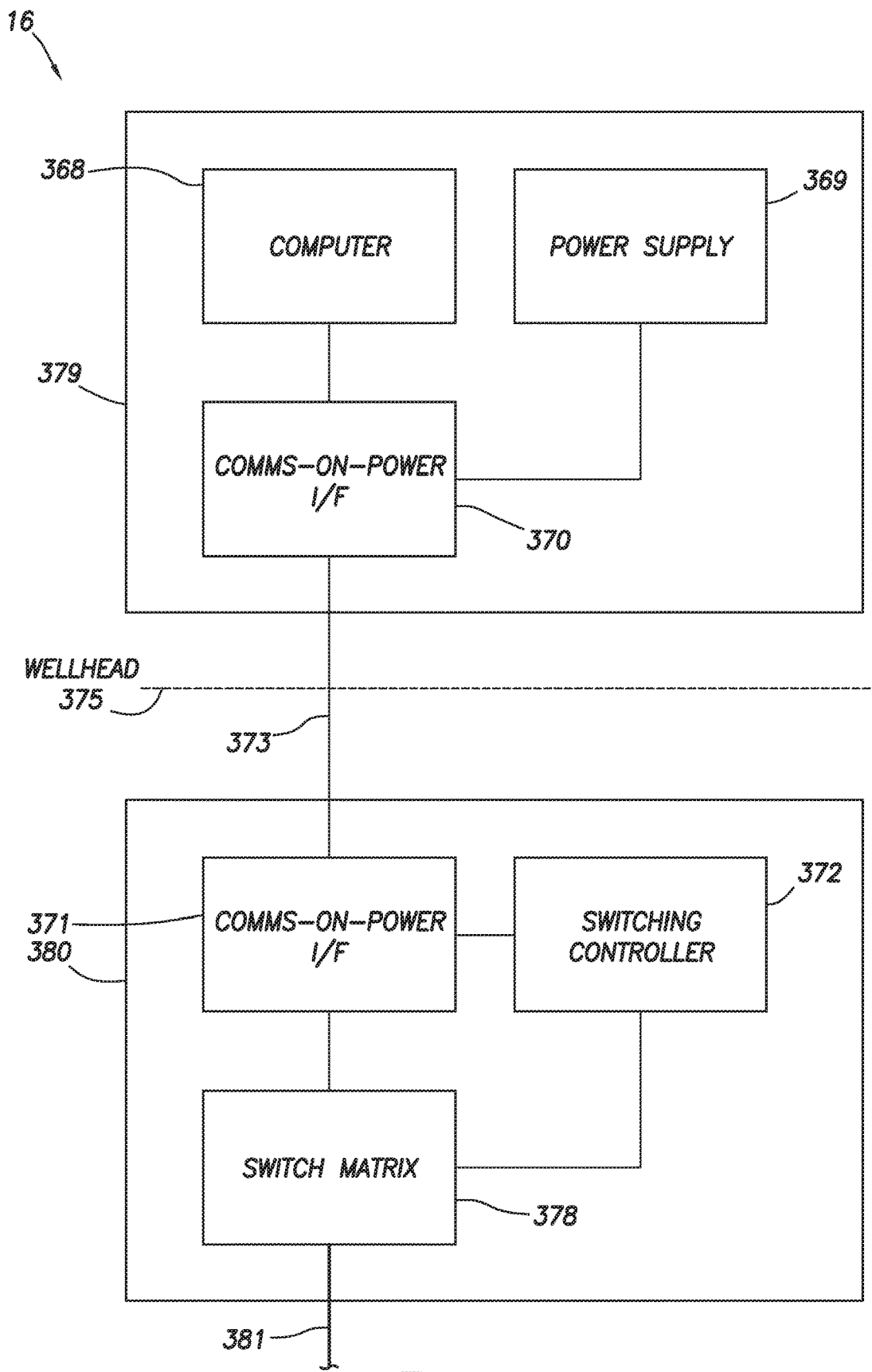
FIG. 25 is a representative block diagram of examples of a system controller and switching module that may be used with subsea well systems and methods.

Referring additionally now to FIG. 25, a block diagram is representatively illustrated for an example of the subsea controller 379. In this example, the subsea controller 379 includes a computer 368, a power supply 369 and a comms-on-power interface 370.

The computer 368 monitors and controls all aspects of the system operation. Communications with the switching module 380 are combined with power for operating the system by the comms-on-power interface 370. In this example, the comms-on-power interface 370 transmits the communications (e.g., data, commands, instructions, signals, etc.) and power together over the one or two conductor TEC 373 to the in-well switching module 380.

The switching module 380 includes a comms-on-power interface 371, a switching controller 372 and a switch matrix 378. The switching controller 372 receives the commands from the computer 368 and controls the switching matrix 378 that selects which downhole flow control valves or ICVs in the system 16 are powered. The output of the switching matrix 378 connects to the downhole flow control valves or ICVs via the multi-conductor TEC 381 or umbilical 25.

The following features may comprise or be included in a well system incorporating the principles of this specification:

A system 16 for use with a subterranean well for hydrocarbon production or water injection, or other production or injection, can include: one or more permanently installed downhole well tools (such as downhole flow control valves or ICVs 9, 10, 11, 12, 30, 33, 36, 39, 170), each being capable of being actuated between first and second positions, and the actuation between positions being performed by an integral DC powered actuator assembly 80, a system controller 1 selectively supplying power to downhole components of the system 16 and controlling actuation of each of the downhole well tools directly without use of a downhole electronic controller in the downhole well tools, and at least one multi-conductor electrical umbilical 25 connecting the system controller 1 to the downhole well tools. Each conductor 2, 3, 4, 5, 133 powers the electric actuator assembly 80 in a single downhole well tool, and the DC power is supplied through the conductor 2-5, 133, and a return (ground) path is through the umbilical 25 armor, well tubing string 23, 377, casing 24 and/or other well structure. A direction of downhole tool actuation is controlled by a polarity of the DC power applied to the downhole well tool actuator assembly 80.

Another system 16 for use with a subterranean well for hydrocarbon production or water injection, or other production of injection, can comprise: one or more permanently installed downhole well tools (such as downhole flow control valves or ICVs 9, 10, 11, 12, 30, 33, 36, 39, 170), each being capable of being actuated between first and second positions, and the actuation between positions being performed by an integral DC powered actuator assembly 80, a system controller 1 selectively supplying power to the downhole components of the system 16 and capable of controlling actuation of the downhole well tools directly without use of a downhole electronic controller in the downhole well tools, and at least one multi-conductor electrical umbilical 25 connecting the system controller 1 to the downhole well tools. In this example, two conductors power an electric actuator assembly 80 in a single downhole well tool, the DC power being supplied through one conductor 2-5, 133, and the return (ground) path is through another conductor 6, and the direction of downhole well tool actuation is controlled by the polarity of the DC power applied to the downhole well tool actuator assembly 80.

The downhole well tool's first and second positions may be closed and open positions in situations where the downhole well tool comprises a valve 170. The valve 170 may be a sliding sleeve type valve where the valve position is changed by moving an inner sleeve 172 with integral flow ports 185 inside an outer housing 171. In other examples, the valve could be a ball valve, in which the valve position is changed by rotating a ball with an integral flow port within an outer housing.

Additional selectable valve positions may be located between the closed and open positions to provide for variable choking of fluid flow through the valve 170. The position of the valve 170 may be indicated by current pulses on the conductor 2-5, 133 supplying power to the actuator assembly 80.

In subsea applications, a portion of the system controller 1 may be moved into the wellbore 13 below a tubing hanger 376 (e.g., the switching module 380) to minimize a number of electrical conductors required to pass through the tubing hanger.

An actuator assembly 80 for a downhole well tool (such as downhole flow control valves or ICVs 9, 10, 11, 12, 30, 33, 36, 39, 170) can comprise: a DC motor 71, 176, 210, 220, 230 controlled and powered directly via a conductor 2-5, 133 connected to the downhole well tool, a planetary gearbox 177, and a ball screw 180, 232 driving a ball nut 181, 233 to move a closure member (such as the inner sleeve 172) of the actuator assembly 80.

A second DC motor 220 and planetary gearbox 221 may be connected to an opposite end of the ball screw 180 and may turn in an opposite direction to the first DC motor 176. An example of this configuration is depicted in FIG. 9.

A complete second DC motor 230, planetary gearbox 231 and ball screw 232 may be mounted parallel to the first (DC motor 176, gearbox 177 and ball screw 180) and whose ball nut 233 moves in tandem with the first ball nut 181. An example of this configuration is depicted in FIG. 10. Third and fourth DC motors 210, 220 may be connected to opposite ends of the ball screws 180, 232 and may turn in opposite directions to the respective first and second DC motors 176, 230. An example of this configuration is depicted in FIG. 11.

A valve position indicator can comprise: profiles 280, 281, 290, 291, 300, 301 machined onto an OD of a shaft 206 to indicate positions of a valve closure member (such as the inner sleeve 172), and a load yoke 207, 234 which traverses along the shaft 206 as the valve closure member is displaced, and a garter spring 271 installed in the load yoke 207, 234, so that when it moves across the OD profiles 280, 281, 290, 291, 300, 301 on the shaft 206 it causes a change in friction that causes change in load on a motor 71, 176, 210, 220, 230, and a pattern modulated on current supplied to the motor 71, 176, 210, 220, 230, the pattern corresponding to a specific position of the valve closure member.

Another valve position indicator can comprise: a cam 322 with one or more lobes 321 that rotates with a ball screw 180, a bow spring 320 that contacts the cam lobe 321 and causes a change in load on a motor 71, 176, 210, 220, 230, and a series of periodic current pulses modulated on current to the motor that corresponds to a specific distance of valve closure member movement per pulse.

Another valve position indicator can comprise: a cam 322 with one or more lobes 321 that rotates with a ball screw 180, a switch contact 342, 361 that contacts the cam lobe 321 and allows current to flow to ground through a current limiting resister 367, and a series of periodic current pulses modulated on current to the motor 71, 176, 210, 220, 230 that corresponds to a specific distance of valve closure member movement per pulse.

Another valve position indicator can comprise: a bar 350 with profiles 352 machined onto a side of the bar to indicate positions of a valve closure member (such as the inner sleeve 172), a load yoke 207 which traverses along the bar 350 as the valve closure member is displaced by a valve actuator assembly 80, a bow spring 351 attached to the load yoke 207, so that when it moves across the profiles 352 machined on the bar 350 it causes a change in friction that causes change in load on a motor 71, 176, 210, 220, 230, and a corresponding pattern modulated on current to the motor 71, 176, 210, 220, 230 that is detectable as a specific position indicator.

Another valve position indicator can comprise: a bar 350 with electrically isolated switch contacts 361 attached to a side of the bar to indicate respective positions of a valve closure member (such as the inner sleeve 172), a load yoke 207 which traverses along the bar 350 as the valve closure member is displaced by a valve actuator assembly 80, an electrically isolated conductive bow spring 362 attached to the load yoke 207, so that when it moves across the switch contacts 361 on the bar 350 it completes an electrical circuit between a conductor supplying electrical power to the motor and a common position indicator conductor 366, and a current limiting resistor 367 that results in a current value unique to that valve closure member position on the common position indicator conductor 366.

A method of selectively actuating a downhole well tool in a well can comprise: applying a DC voltage to an electrical conductor 2-5, 133 connected directly to an actuator assembly 80 of the downhole well tool, and monitoring current in the conductor to determine operational conditions (such as valve closure member position) of the downhole well tool.

The DC voltage polarity can be reversed, in order to reverse a direction of actuation of the downhole well tool.

The method may include the steps of: the actuator assembly 80 modulating current pulses 314 onto the DC voltage conductor 2-5, 133 to indicate movement of discrete linear distance per pulse, a system controller 1 counting the current pulses 314 to determine actuator assembly 80 position (such as, a position of the load yoke 207, 234, which corresponds to a valve closure member 172 position), and ceasing the DC voltage supply to the actuator assembly 80 when a desired position has been reached.

The method may include the steps of: the actuator assembly 80 modulating current pulses 314 of variable number, length, and/or amplitude onto the DC voltage conductor 2-5, 133 which correspond to specific actuator assembly positions that have been reached, the system controller 1 decoding the current pulses 314 to determine a current actuator assembly position, and ceasing the DC Voltage supply to the actuator assembly 80 when the current position is a desired position of the actuator assembly.

The method may include the steps of: the system controller 1 monitoring current to the actuator assembly 80 and elapsed time to estimate actuator assembly position, and ceasing the DC Voltage supply to the actuator assembly 80 when a desired position has been reached.

A downhole well tool for use in a subterranean well is provided to the art by the above disclosure. In one example, the downhole well tool can comprise: an actuator assembly 80 configured to displace a member 172 of the downhole well tool, the actuator assembly 80 comprising a first motor 176, a load yoke 207, 234 displaceable by the first motor 176, and an elongated position indicator bar 206, 350 having at least one profile 280, 281, 290, 291, 352 formed thereon. Friction between the load yoke 207, 234 and the position indicator bar 206, 350 varies as the load yoke 207, 234 displaces relative to the position indicator bar 206, 350.

The member 172 may comprise a closure member having at least open and closed positions in which fluid flow through the downhole well tool is respectively permitted and blocked by the closure member. The member 172 may also have one or more intermediate positions in which the fluid flow is restricted or choked.

The actuator assembly 80 may comprise a garter spring 271 carried on the load yoke 207, 234, and the friction between the load yoke 207, 234 and the position indicator bar 206, 350 may change in response to engagement between the garter spring 271 and the at least one profile 280, 281, 290, 291, 352. The friction may increase or decrease in response to engagement between the garter spring 271 and the at least one profile 280, 281, 290, 291, 352.

The actuator assembly 80 may comprise a bow spring 351 carried on the load yoke 207, and the friction between the load yoke 207 and the position indicator bar 350 may change in response to engagement between the bow spring 351 and the at least one profile 352. The friction may increase or decrease in response to engagement between the bow spring 351 and the at least one profile 352.

A change in the friction may result in a corresponding change in electrical current supplied to the first motor 176. The change in electrical current may corresponds to a predetermined position of the member 172 of the downhole well tool.

Multiple changes in the friction may result in a corresponding pattern of changes in electrical current supplied to the first motor 176. The pattern of changes in electrical current may correspond to a predetermined position of the member 172 of the downhole well tool.

A direction of displacement of the downhole well tool member 172 may be reversible in response to a change in polarity of electrical power supplied to the first motor 176.

The actuator assembly 80 may comprise a second motor 220, and a first ball screw 180. The first and second motors 176, 220 may be connected to respective opposite ends of the first ball screw 180.

The actuator assembly 80 may comprise third and fourth motors 210, 230, and a second ball screw 232. The third and fourth motors 210, 230 may be connected to respective opposite ends of the second ball screw 232.

The actuator assembly 80 may comprise a second motor 230, and first and second ball screws 180, 232. The first motor 176 may be connected to the first ball screw 180, the second motor 230 may be connected to the second ball screw 232, and the load yoke 234 may be displaceable by rotation of the first and second ball screws 180, 232 by the first and second motors 176, 230.

Another downhole well tool provided to the art by the above disclosure can comprise: an actuator assembly 80 configured to displace a member 172 of the downhole well tool, the actuator assembly 80 comprising a motor 176, a cam 322 rotatable by the motor 176, and a bow spring 320 positioned to periodically engage at least one cam lobe 321 on the cam 322 as the cam 322 is rotated by the motor 176. Friction between the bow spring 320 and the cam 322 varies as the cam 322 is rotated by the motor 176.

The member 172 may comprise a closure member having at least open and closed positions in which fluid flow through the downhole well tool is respectively permitted and blocked by the closure member. The member 172 may also have one or more intermediate positions in which the fluid flow is restricted or choked.

The change in the friction may result in a corresponding change in electrical current supplied to the motor 176. The change in electrical current may correspond to a predetermined incremental displacement of the member 172.

A direction of displacement of the downhole well tool member 172 may be reversible in response to a change in polarity of electrical power supplied to the first motor 176.

Another downhole well tool provided to the art by the above disclosure can comprise: an actuator assembly 80 configured to displace a member 172 of the downhole well tool, the actuator assembly 80 comprising a motor 176, a cam 322 rotatable by the motor 176, and a switch contact 342 positioned to periodically electrically contact a bow spring 341 in response to engagement between the bow spring 341 and at least one cam lobe 321 on the cam 322 as the cam 322 is rotated by the motor 176.

The member 172 may comprise a closure member having at least open and closed positions in which fluid flow through the downhole well tool is respectively permitted and blocked by the closure member. The member 172 may also have one or more intermediate positions in which the fluid flow is restricted or choked.

The electrical contact between the bow spring 341 and the switch contact 342 may result in a corresponding change in electrical current in a conductor 2-5, 133 connected to the motor. The change in electrical current may correspond to a predetermined incremental displacement of the member 172.

A direction of displacement of the downhole well tool member 172 may be reversible in response to a change in polarity of electrical power supplied to the first motor 176.

Another downhole well tool provided to the art by the above disclosure can comprise: an actuator assembly 80 configured to displace a member 172 of the downhole well tool, the actuator assembly 80 comprising a motor 176, a load yoke 207 displaceable by the motor 176, a bow spring 351 carried on the load yoke 207, and an elongated position indicator bar 350 having at least one switch contact 361 positioned thereon. Electrical contact between the bow spring 351 and the switch contact 361 changes an electrical current in a conductor 366 connected to the motor 176.

The member 172 may comprise a closure member having at least open and closed positions in which fluid flow through the downhole well tool is respectively permitted and blocked by the closure member. The member 172 may also have one or more intermediate positions in which the fluid flow is restricted or choked.

The change in electrical current may correspond to a predetermined position of the member 172 of the downhole well tool.

A direction of displacement of the downhole well tool member 172 may be reversible in response to a change in polarity of electrical power supplied to the motor 176.

The "at least one" switch contact 361 may comprise multiple switch contacts. At least one of multiple different resistors 367 may be connected between each of the switch contacts 361 and the conductor 366. Each of the "at least one of multiple" different resistors may correspond to a respective different position of the member 172.

Also provided to the art by the above disclosure is a system 16 for use with a subterranean well. In one example, the system 16 can comprise: a system controller 1, 379 comprising a computer 60, a power supply 61 and at least one current sensor 70; multiple downhole well tools 9, 10, 11, 12, 30, 33, 36, 39, 170, each of the downhole well tools comprising a motor 176 and a member 172 displaceable by the motor 176; and an umbilical 25 connected between the system controller 1 and the downhole well tools 9-12, 30, 33, 36, 39, 170, at least one conductor 2-5, 133 of the umbilical 25 being connected to the motor 176 of each of the downhole well tools 9-12, 30, 33, 36, 39, 170.

A change in current in the conductor 2-5, 133 connected to the motor 176 of one of the downhole well tools 9-12, 30, 33, 36, 39, 170 may indicate a position of the member 172 of the one of the downhole well tools. A pattern of changes in current in the conductor 2-5, 133 connected to the motor of one of the downhole well tools 9-12, 30, 33, 36, 39, 170 may indicate a position of the member 172 of the one of the downhole well tools.

The system 16 may comprise a switching module 380 connected between the system controller 379 and the downhole well tools 9-12, 30, 33, 36, 39, 170. The system controller 379 may be positioned subsea, and a tubing hanger 376 may be positioned between the switching module 380 and the system controller 379.

The switching module 380 may supply electrical power to the at least one conductor 2-5, 133 (e.g., in the TEC 373) in response to communication from the system controller 379. The switching module 380 may change a polarity of electrical power supplied to the at least one conductor 2-5, 133 in response to communication from the system controller 379.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A downhole well tool for use in a subterranean well, the downhole well tool comprising:
   an actuator assembly configured to displace a member of the downhole well tool, the actuator assembly comprising a first motor, a load yoke displaceable by the first motor, and an elongated position indicator bar having at least one profile formed thereon,
   in which friction between the load yoke and the position indicator bar is adapted to vary as the load yoke displaces relative to the position indicator bar, and
   in which the actuator assembly further comprises a garter spring carried on the load yoke, and the friction between the load yoke and the position indicator bar is adapted to change in response to engagement between the garter spring and the at least one profile.

2. The downhole well tool of claim 1, in which the friction increases in response to engagement between the garter spring and the at least one profile.

3. The downhole well tool of claim 1, in which the friction decreases in response to engagement between the garter spring and the at least one profile.

4. A downhole well tool for use in a subterranean well, the downhole well tool comprising:
   an actuator assembly configured to displace a member of the downhole well tool, the actuator assembly comprising a first motor, a load yoke displaceable by the first motor, and an elongated position indicator bar having at least one profile formed thereon,
   in which friction between the load yoke and the position indicator bar is adapted to vary as the load yoke displaces relative to the position indicator bar, and
   in which the actuator assembly further comprises a bow spring carried on the load yoke, and the friction between the load yoke and the position indicator bar is adapted to change in response to engagement between the bow spring and the at least one profile.

5. The downhole well tool of claim 4, in which the friction increases in response to engagement between the bow spring and the at least one profile.

6. The downhole well tool of claim 4, in which the friction decreases in response to engagement between the bow spring and the at least one profile.

7. A downhole well tool for use in a subterranean well, the downhole well tool comprising:
   an actuator assembly configured to displace a member of the downhole well tool, the actuator assembly comprising a first motor, a load yoke displaceable by the first motor, and an elongated position indicator bar having at least one profile formed thereon, the at least one profile being radially enlarged relative to a nominal diameter of the position indicator bar,
   in which friction between the load yoke and the position indicator bar is adapted to vary as the load yoke displaces from a first side of the at least one profile to a second side of the at least one profile opposite the first side, and
   in which a change in the friction causes a corresponding change in electrical current supplied to the first motor.

8. The downhole well tool of claim 7, in which the change in electrical current corresponds to a predetermined position of the member of the downhole well tool.

9. A downhole well tool for use in a subterranean well, the downhole well tool comprising:
   an actuator assembly configured to displace a member of the downhole well tool, the actuator assembly comprising a first motor, a load yoke displaceable by the first motor, and an elongated position indicator bar having at least one profile formed thereon, the at least one profile being radially enlarged relative to a nominal diameter of the position indicator bar,
   in which friction between the load yoke and the position indicator bar is adapted to vary as the load yoke displaces from a first side of the at least one profile to a second side of the at least one profile opposite the first side, and
   in which multiple changes in the friction cause a corresponding pattern of changes in electrical current supplied to the first motor.

10. The downhole well tool of claim 9, in which the pattern of changes in electrical current corresponds to a predetermined position of the member of the downhole well tool.

11. A downhole well tool for use in a subterranean well, the downhole well tool comprising:
    an actuator assembly configured to displace a member of the downhole well tool, the actuator assembly comprising a first motor, a load yoke displaceable by the first motor, and an elongated position indicator bar having at least one profile formed thereon, the at least one profile being radially enlarged relative to a nominal diameter of the position indicator bar,
    in which friction between the load yoke and the position indicator bar is adapted to vary as the load yoke displaces from a first side of the at least one profile to a second side of the at least one profile opposite the first side, and
    in which the actuator assembly comprises a second motor, and a first ball screw, and in which the first and second motors are connected to respective opposite ends of the first ball screw.

12. The downhole well tool of claim 11, in which the actuator assembly comprises third and fourth motors, and a second ball screw, and in which the third and fourth motors are connected to respective opposite ends of the second ball screw.

13. A downhole well tool for use in a subterranean well, the downhole well tool comprising:
    an actuator assembly configured to displace a member of the downhole well tool, the actuator assembly comprising a first motor, a load yoke displaceable by the first motor, and an elongated position indicator bar having at least one profile formed thereon, the at least one profile being radially enlarged relative to a nominal diameter of the position indicator bar,
    in which friction between the load yoke and the position indicator bar is adapted to vary as the load yoke displaces from a first side of the at least one profile to a second side of the at least one profile opposite the first side, and
    in which the actuator assembly comprises a second motor, and first and second ball screws, and in which the first motor is connected to the first ball screw, the second motor is connected to the second ball screw, and the load yoke is displaceable by rotation of the first and second ball screws by the first and second motors.

* * * * *